(12) United States Patent
Ichikawa et al.

(10) Patent No.: US 7,626,615 B2
(45) Date of Patent: Dec. 1, 2009

(54) PRINTER SYSTEM AND IMAGE PROCESSING SYSTEM HAVING IMAGE CORRECTING FUNCTION

(75) Inventors: Koji Ichikawa, Asaka (JP); Koichi Sakamoto, Asaka (JP); Masahiko Sugimoto, Asaka (JP); Hiroshi Tanaka, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 104 days.

(21) Appl. No.: 11/257,117

(22) Filed: Oct. 25, 2005

(65) Prior Publication Data

US 2006/0092293 A1 May 4, 2006

Related U.S. Application Data

(62) Division of application No. 10/117,224, filed on Apr. 8, 2002, now Pat. No. 7,304,668.

(30) Foreign Application Priority Data

Apr. 11, 2001 (JP) .............................. 2001-112860
Aug. 24, 2001 (JP) .............................. 2001-254078

(51) Int. Cl.
*H04N 9/73* (2006.01)
*H04N 5/225* (2006.01)
*H04N 5/76* (2006.01)

(52) U.S. Cl. ............... 348/223.1; 348/207.2; 348/231.6

(58) Field of Classification Search ............. 348/207.1, 348/207.2, 222.1, 223.1, 231.99, 231.2, 231.3, 348/231.6, 333.12

See application file for complete search history.

(56) References Cited

U.S. PATENT DOCUMENTS 6,115,137 A * 9/2000 Ozawa et al. ................. 358/1.6
6,273,535 B1 * 8/2001 Inoue et al. ..................... 347/3

(Continued)

FOREIGN PATENT DOCUMENTS

JP          03-072338          3/1991

(Continued)

OTHER PUBLICATIONS

Office Action in counterpart Japanese Application.

*Primary Examiner*—Sinh Tran
*Assistant Examiner*—Daniel M Pasiewicz
(74) *Attorney, Agent, or Firm*—Sughrue Mion, PLLC

(57) ABSTRACT

A setting for white balance used by a camera during image-capturing can be reflected in a printer, thereby preventing, during printing, execution of such correction as negates an atmosphere of a light source in a recorded image in which the atmosphere has been intentionally allowed to remain. A camera used for a system of the present invention is a digital camera having a white balance process function of allowing the atmosphere of a photographing light source to remain in an image. During image-capturing, WB adaptation rate information indicative of a level of white balance correction is recorded on a recording medium as additional information. A printer reads the WB adaptation rate information for the camera via the recording medium to control white balance in accordance with the setting for the WB adaptation rate. For example, if the WB adaptation rate is less than 100%, then an AWB process executed by the printer is turned off to print the recorded image without changing its tints.

6 Claims, 15 Drawing Sheets

U.S. PATENT DOCUMENTS

| | | | |
|---|---|---|---|
| 6,650,365 B1 * | 11/2003 | Sato | 348/231.3 |
| 6,668,134 B1 * | 12/2003 | Niikawa | 386/95 |
| 6,765,686 B2 * | 7/2004 | Maruoka | 358/1.15 |
| 6,850,271 B1 * | 2/2005 | Ichikawa | 348/207.2 |
| 2001/0012072 A1 * | 8/2001 | Ueno | 348/333.02 |
| 2006/0139478 A1 * | 6/2006 | Nozaki | 348/345 |

FOREIGN PATENT DOCUMENTS

| | | |
|---|---|---|
| JP | 06-008537 | 1/1994 |
| JP | 08-065689 | 3/1996 |
| JP | 10-191246 | 7/1998 |
| JP | 2000-224608 | 8/2000 |
| JP | 2000-354255 | * 12/2000 |

* cited by examiner

| AWB ADPTATION RATE | MANUAL WB CORRECTION | NEED FOR PRINTER WB CORRECTION | PRINTER WB CORRECTION |
|---|---|---|---|
| 1 | ON | REQUIRED, NOT REQUIRED | OFF |
| 1 | OFF | NOT REQUIRED | OFF |
| 1 | OFF | REQUIRED | ON |
| NOT1 | ON | REQUIRED, NOT REQUIRED | OFF |
| NOT1 | OFF | REQUIRED, NOT REQUIRED | OFF |

FIG.13(b)

| MANUAL BRIGHTNESS CORRECTION | NEED FOR PRINTER BRIGHTNESS CORRECTION | PRINTER BRIGHTNESS CORRECTION |
|---|---|---|
| ON | REQUIRED | OFF |
| ON | NOT REQUIRED | OFF |
| OFF | REQUIRED | ON |
| OFF | NOT REQUIRED | OFF |

PRINTER SYSTEM AND IMAGE PROCESSING SYSTEM HAVING IMAGE CORRECTING FUNCTION

This is a divisional of application Ser. No. 10/117,224 filed Apr. 8, 2002 now U.S. Pat. No. 7,304,668. The entire disclosure is hereby incorporated by reference.

BACKGROUND OF THE INVENTION

1. Field of the Invention

The present invention relates to a white balance control technique for a system composed of an electronic camera and a printer. Further, the present invention relates to an image pickup device, an image processing device, an image processing system, an image processing method, and an image processing program. In particular, the present invention relates to an image pickup device which outputs an image and information on correction of the image in association with each other to control correction of the image executed by an external image processing device, and an image processing device which corrects an image on the basis of information on correction of an image.

2. Description of the Related Art

In automatic white balance (AWB) executed by an electronic camera, the type of a light source is determined on the basis of information from an external white balance (WB) sensor, which determines color temperature, or a CCD image sensor, so as to execute white balance adjustment suitable for the determined light source (Japanese Patent Application Publication No. 2000-224608). The basis of AWB is that a gray object is photographed as a gray image under a photographing light source. However, some types of electronic cameras provide such control that AWB correction is weakened depending on the determined type of the light source in order to allow the atmosphere of the light source in that scene to remain in the image. For example, if an image is captured under a tungsten light source, then to allow the impression of the scene to remain in the image, slightly weakened white balance is executed to allow the gray part of the image to remain reddish.

On the other hand, when an image captured by an electronic camera is printed, a printer also executes an AWB process. The AWB process executed by the printer is often set in order to correct an image with an AWB error committed by the electronic camera during image-capturing.

However, if a print is created using a combination of the "electronic camera having the AWB function of allowing the atmosphere of a light source to remain in an image" and the "printer executing the AWB process" as described above, then the following disadvantage results: an image signal obtained as a result of image pickup executed by the electronic camera does not undergo such a WB process as allows the atmosphere of the light source in that scene to remain in the image, but the printer determines that this image has a WB error and creates a print in which the atmosphere of the light source is negated.

Conventionally, common digital cameras have a function of correcting chromaticity or brightness of a captured image on the basis of a pre-shipment setting or a user's setting. Further, the digital camera displays a captured image on an LCD monitor thereof. Then, a user can manually adjust the chromaticity or brightness of the image while viewing the image displayed on the LCD monitor. Further, image processing devices such as monitors or printers are utilized which automatically correct the chromaticity or brightness of an image obtained from a digital camera on the basis of a pre-shipment setting or a user's setting.

However, even if the user manually adjusts the chromaticity or brightness of the image while viewing the image displayed on the LCD monitor of the digital camera, the image processing device such as a monitor or a printer or the like may automatically correct the image contrary to the user's intention and output the corrected image.

SUMMARY OF THE INVENTION

The present invention is achieved in view of these points, and it is an object of the present invention to provide a printer system that allows a setting for white balance intended by a camera user to be reflected on a printer and which can prevent a print with the atmosphere of a light source negated, a white balance control method for this printer system, and an electronic camera and a printer both used for this system.

It is another object of the present invention to provide an image pickup device, and image processing device, an image processing system, an image processing method, and an image processing program that can solve above-described problems.

To attain this object, a first aspect of the present invention provides a printer system that uses a printer to print an image captured by an electronic camera, characterized in that the electronic camera comprises a white balance correcting device which corrects white balance of an image signal obtained using an image pickup device, so that atmosphere of a photographing light source remains in the signal, and a recording device which records data on white balance adaptation rate on a recording medium as additional image information together with a captured image, the white balance adaptation rate being indicative of the level of white balance correction executed by the white balance correcting device, and the printer comprises an information obtaining device which takes the image and additional information therefor recorded on the recording medium, and a white balance control device which controls a white balance process executed by the printer using the white balance adaptation rate information contained in the additional information taken through the information obtaining device.

The electronic camera used for the system of the present invention has the white balance processing function of allowing the atmosphere of a photographing light source to remain in the image so that during image-capturing, the adaptation rate information indicative of the level of white balance correction is recorded on the recording medium as additional information for the captured image. The adaptation rate for the camera may be automatically determined using the automatic white balance function of the camera or may be manually arbitrarily set by the user by operating a predetermined operating device.

The printer reads the adaptation rate information from the camera via the information obtaining device to control the white balance process in accordance with this information. In this manner, the printer executes the white balance control in accordance with the setting for the white balance adaptation rate for the electronic camera, thereby enabling creation of a print with the atmosphere of the light source negated.

A second aspect of the present invention provides a white balance control method applied to the above system. That is, this aspect provides a white balance control method applied to a printer system that uses a printer to print an image captured by an electronic camera, characterized by comprising the steps of executing a white balance correcting process when the image is captured by the electronic camera, so that atmosphere of a photographing light source remains in the image, recording data on white balance adaptation rate on a recording medium as additional image information together with a captured image, the white balance adaptation rate being indicative of the level of white balance correction executed by the white balance correcting process, taking the image and additional information therefor recorded on the recording medium, in the printer, and controlling the white balance process executed by the printer by using the white balance adaptation rate information contained in the additional information taken by the printer, to execute printing on the basis of white balance reflecting the white balance adaptation rate set using the electronic camera.

A third aspect of the present invention is an electronic camera used for the above system. The electronic camera according to the present invention is characterized by comprising an image pickup device which converts an optical image of an object into an electric signal, a white balance correcting device which executes a white balance correcting process on an image signal obtained via the image pickup device, so that atmosphere of a photographing light source remains in the image signal, and a recording device which records data on white balance adaptation rate on a recording medium as additional image information together with a captured image, the white balance adaptation rate being indicative of the level of white balance correction executed by the white balance correcting device.

A printer according to a fourth aspect of the present invention is used for the above-described system and characterized by comprising an information obtaining device which takes an image captured by an electronic camera and information on white balance adaptation rate indicative of the level of white balance correction for the image, a white balance control device which controls a white balance process during printing using the white balance adaptation rate information taken from the information obtaining device, and a print device which executes, in accordance with white balance control executed by the white balance control device, printing based on white balance reflecting the white balance adaptation rate set using the electronic camera.

As an aspect of white balance control executed by the printer in accordance with the setting for the white balance adaptation rate for the electronic camera, when in the printer of the present invention, white balance correcting process executed by the white balance correcting device inside the printer to obtain gray (R=G=B) in which red (R), green (G), and blue (B) have an equal signal level is defined as a "normal white balance correcting process", the white balance control device executes the normal white balance correcting process if the white balance adaptation rate information cannot be obtained.

Further, the present invention is characterized in that the white balance control device turns off the white balance process executed by the printer if the value of the white balance adaptation rate taken through the information obtaining device is smaller than a set threshold. For example, the threshold may be set at a value indicative of complete correction or may be varied by a user's operation.

Furthermore, another aspect of the present invention is characterized in that the white balance adaptation rate can be represented as a numerical value varying from 100%, which is indicative of complete correction, to 0%, which is indicative of no white balance correction, and when the amount of white balance correction executed by the white balance correcting device inside the printer to obtain gray (R=G=B) in which red (R), green (G), and blue (B) have an equal signal level is defined as the "normal amount of white balance correction", the white balance control device determines the amount of white balance correction executed by the printer on the basis of the following equation:

the amount of white balance correction executed by the printer=the normal amount of white balance correction×white balance adaptation rate (%)/100.

Further, according to another aspect, the printer of the present invention includes a "camera adaptation rate neglect mode" in which the normal white balance correcting process is also executed if the white balance adaptation rate information is taken, and the camera adaptation rate neglect mode can be selected by operating a mode selecting device.

Either a "camera adaptation rate utilization mode" in which the white balance process is executed so as to reflect the white balance adaptation rate set using the electronic camera or the "camera adaptation rate neglect mode" can be selected depending on the user's operation so that a white balance control method can be switched on the basis of the selected mode, thereby accommodating the user's diverse requests.

An image pickup device according to a fifth aspect of the present invention comprises a correcting section which corrects the chromaticity or brightness of a captured image, and a storage section which stores information on correction of the captured image executed by the correcting section, in association with the captured image.

The correcting section may have an automatic correcting section that corrects the captured image on the basis of the amount of correction predetermined for the image pickup device, and the storage section may store the amount of correction executed by the automatic correction section, as information on correction of the captured image.

The correcting section may have a manual correcting section that corrects the captured image on the basis of the user's operation, and the storage section may store the amount of correction executed by the manual correction section, as information on correction of the captured image.

The correcting section may have a manual correcting section that corrects the captured image on the basis of the user's operation, and the storage section may store, as information on correction of the captured image, information indicating whether or not the manual correcting section has executed correction.

The storage section may store, as information on correction of the captured image, information indicating to an external image processing device whether or not to inhibit correction of the captured image.

The correcting section may have a manual correcting section that corrects the captured image on the basis of the user's operation, and the storage section may store, as information on correction of the captured image, information indicating to the captured image processing device that the captured image is to be inhibited from being corrected.

The correcting section may further comprises an automatic correcting section which corrects the captured image on the basis of the amount of correction predetermined for the image pickup device, a confirming section which allows the user to confirm the captured image corrected by the automatic correcting section, and a determining section which determines whether or not the user has confirmed the captured image. If the determining section determines that the user has confirmed the captured image, the storage section may store, as information on correction of the captured image, information indicating to the captured image processing device that the captured image is to be inhibited from being corrected.

The image pickup device may further comprise an output section that outputs information on correction of the captured image and the captured image to an exterior in association with each other.

An image processing device according to a sixth aspect of the present invention comprises a displayed image generating section which generates a displayed image on the basis of an original image, a display section which displays the displayed image generated by the displayed image generating section, a correcting section which corrects the displayed image displayed by the display section, on the basis of a user's operation, and a storage section which stores contents of the correction executed by the correcting section, in association with the original image.

The displayed image generating section extracts a partial area of the original image to generate the displayed image. The displayed image generating section generates the displayed image by enlarging the partial area and synthesizing the original image with the enlarged partial area. The image processing device may further comprise an output section that outputs the original image and the contents of the correction.

The image processing device may further comprise a printing section that prints the original image corrected by the correcting section. The image processing device may further comprise an image pickup section that captures the original image.

An image processing device according to a seventh aspect of the present invention comprises a receiving section which receives an image and information on correction of the image, a processing section which executes image processing on the image, and a control section which controls the image processing executed by the processing section, on the basis of information on correction of the image. The receiving section may receive, as information on correction of the image, information indicating whether or not the image has been corrected on the basis of a user's operation, and upon receiving information indicating that the image has been corrected on the basis of the user's operation, the control section may inhibit the processing section from executing the image processing.

The receiving section may receive information indicative of the white balance adaptation rate of the image as information on correction of the image, and if the white balance adaptation rate does not have a predetermined value, the control section may inhibit the processing section from executing the image processing for adjusting white balance.

The above described summary of the present invention does not list all features required for the present invention, but subcombinations of this group of features may constitute aspects of the present invention.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2 is a graph showing detection frames indicative color distribution ranges corresponding to light source types or the like;

FIGS. 13(a) and 13(b) are diagrams showing examples of data formats of determination tables provided in a control section 402;

DETAILED DESCRIPTION OF THE PREFERRED EMBODIMENTS

Preferred embodiments of the present invention will be described below in detail with reference to the accompanying drawings. The following embodiments are not intended to restrict the claims to such an invention, and all the combinations of the features described in the embodiments are not essential to the solution provided by the present invention.

First Embodiment

Figure 1:
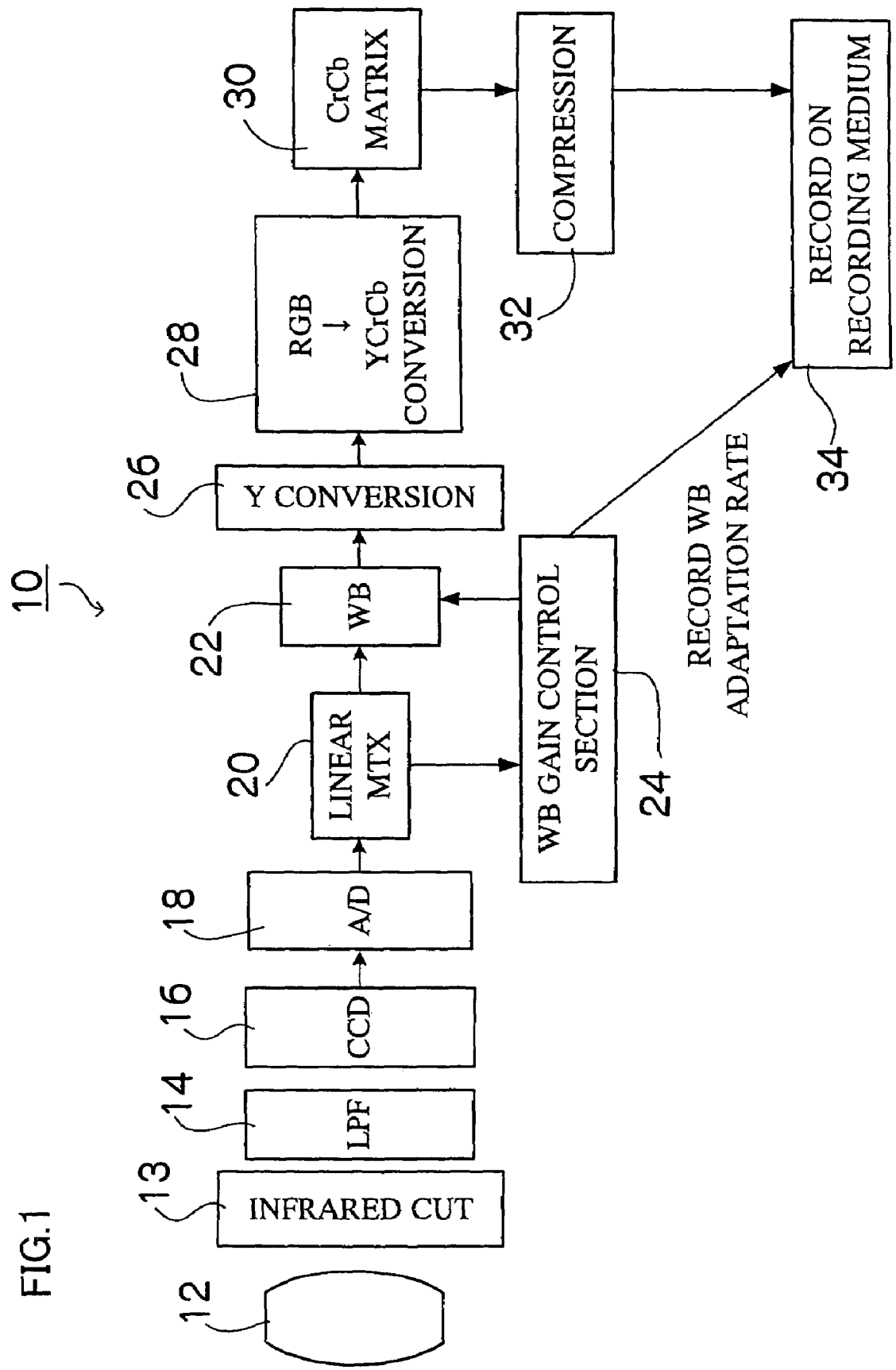
FIG. 1 is a block diagram of a digital camera according to an embodiment of the present invention.

FIG. 1 is a block diagram of a digital camera according to an embodiment of the present invention. A taking lens 12 of a camera 10 may be a single-focus lens or a focal-distance-variable lens such as a zoom lens. Light passing through the taking lens 12 is formed into an image on a CCD image sensor (Hereinafter referred to as a "CCD") 16 via an infrared cut filter 13 and an optical low pass filter 14. The CCD 16 has photo sensors two-dimensionally arranged on a light receiving surface thereof and primary color filters for red (R), green (G), and blue (B) arranged in a predetermined form so as to correspond to the sensors.

An image of an object formed on the light receiving surface of the CCD 16 is converted by the photo sensors into signal charges the amount of which corresponds to the amount of incident light. The CCD 16 has what is called an electronic shutter function of using shutter gate pulse timings to control the time required by the photo sensors to accumulate charges (shutter speed).

The signal charges accumulated in the photo sensors of the CCD 16 are sequentially read out on the basis of pulses provided by a CCD driver, not shown, to obtain voltage signals (image signals) which are dependent on the signal charges. An image signal output by the CCD 16 is subjected to predetermined analog signal processes such as a correlated double sampling (CDS) process and a color separation process, and is then converted into a digital signal by an A/D conversion section 18.

The digitalized image signal is added to a linear matrix circuit 20. The linear matrix circuit 20 converts the input RGB data in accordance with the following Equation <1> to obtain new RGB data:

$$\begin{pmatrix} R' \\ G' \\ B' \end{pmatrix} = \begin{pmatrix} a & b & c \\ d & e & f \\ g & h & i \end{pmatrix} \begin{pmatrix} R \\ G \\ B \end{pmatrix} \qquad <1>$$

where a to i denote constants.

The signal processed by the linear matrix circuit 20 is transmitted to a white balance adjusting circuit (hereinafter referred to as a "WB circuit") 22 and a white balance gain control section 24. In this specification, "white balance" will be simply referred to as "WB" as required. The WB circuit 22 is composed of multipliers each of which increases and reduces the digital value of a corresponding one of the RGB color signals. Each color signal is added to the corresponding multiplier. The multiplier for each color is provided with an instruction for a white balance correction value (gain value) Rg, Gg, or Bg by a WB gain control section 24 to adjust the level of the color signal in accordance with the instruction. The RGB signal subjected to the white balance adjustment in the WB circuit 22 is transmitted to a gamma conversion circuit 26. The contents of control executed by the WB gain control section 24 and the concept of a WB adaptation rate used for this control will be described later.

The gamma conversion circuit 26 converts the input/output characteristics of the white-balance-adjusted RGB signal so that the signal has desired gamma characteristics. The gamma-converted signal is transmitted to an RGB→Y Cr Cb conversion circuit (hereinafter referred to as a "YC conversion circuit") 28, which then converts this RGB signal into a luminance signal Y and color difference signals Cr and Cb.

The luminance and color difference signals (Y, Cr, and Cb) obtained by the YC conversion circuit 28 are transmitted to a Cr Cb matrix circuit 30 to execute color correction on the color difference signals. The image data processed by the Cb Cr matrix circuit 30 is compressed into a predetermined format such as JPEG by a compression/decompression circuit 32, and is then recorded on a recording medium 34 such as a memory card. At this time, information on the WB adaptation rate controlled by the WB gain control section 24 is recorded on the recording medium 34 as additional image information. For example, the WB adaptation rate is written to an image file so as to be contained in tag information. The recording medium 34 is not limited to a removable medium but may be an internal memory of the camera 10.

Now, a white balance control method executed by the camera 10 configured as described above will be described. An AE (Automatic Exposure adjustment) control is executed in response to a half-depression operation of a shutter button, not shown. With the AE control, an R, G, and B signals are taken a plurality of times using a predetermined exposure value, and these R, G, and B signals are integrated together to obtain an integrated value. Then, on the basis of integrated value, the luminance (image-capturing EV value) of an object is determined, and on the basis of this image-capturing EV value, an aperture value and shutter speed during image-capturing are finally determined. Then, when the shutter button is fully depressed, a diaphragm and an electronic shutter (charge accumulation time) are controlled in accordance with the determined aperture value and shutter speed.

The R, G, and B signals for one screen taken through the CCD 16 in response to the full depression of the shutter button are transmitted to the WB gain control section 24 via the linear matrix circuit 20. The WB gain control section 24 divides the screen into a plurality of areas (for example, 8×8) and finds an average integrated value for each the R, G, and B signals for each divided area. The WB gain control section 24 then finds the ratio R/G of the integrated value for the R signal to the integrated value for the G signal and the ratio B/G of the integrated value for the B signal and the integrated value for the G signal.

Figure 2:
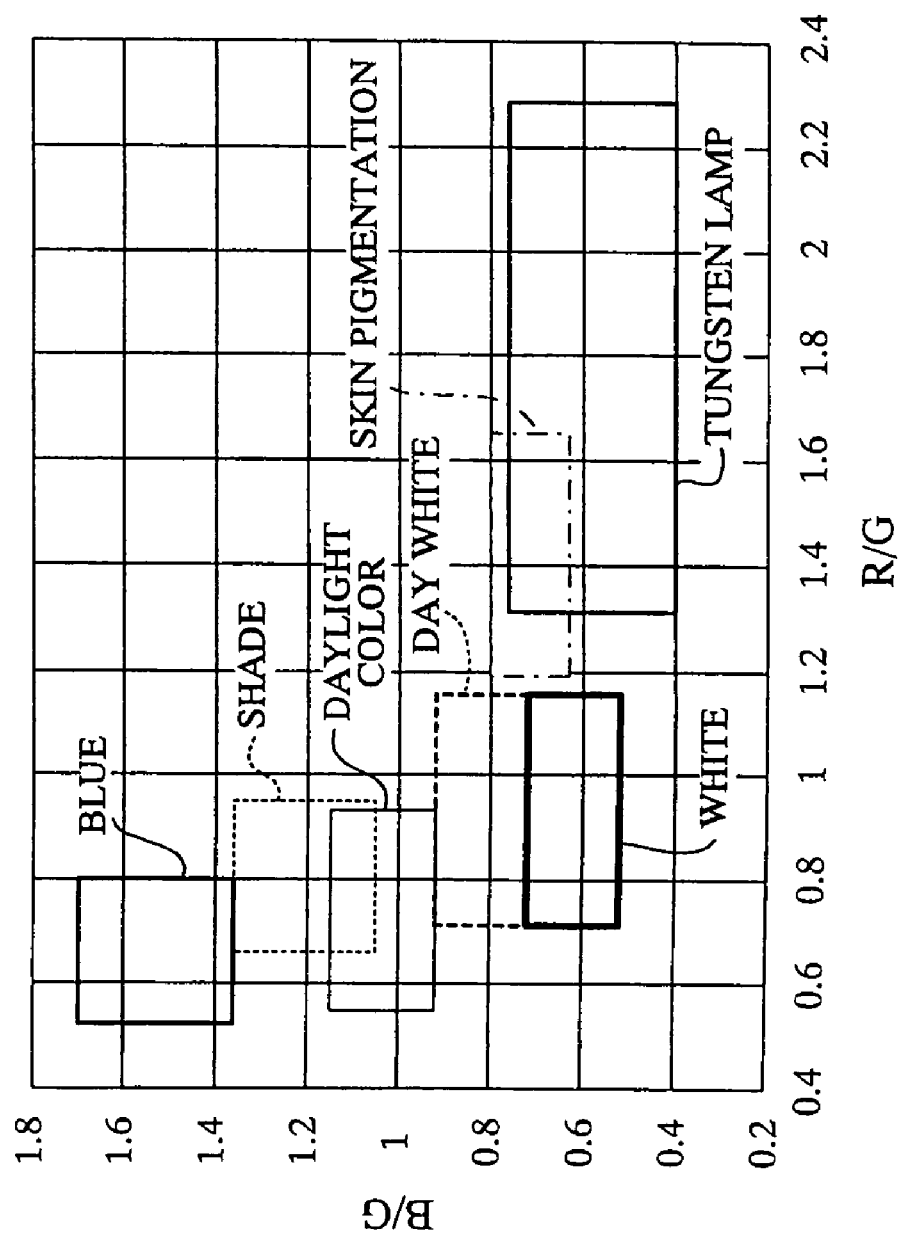

The ratios R/G and B/G determined for each divided area are used to determine which of the plurality of detection frames shown on the graph in FIG. 2 contains the divided area. The detection frames in FIG. 2 including a shade detection frame, a day light color detection frame, a day white detection frame, a white detection frame, a tungsten detection frame, and others define color distribution ranges corresponding to light source types. On the basis of the number of areas contained in the detection frames, the light source type is automatically determined so that white balance adjustment is executed correspondingly to the light source type.

Figure 3:
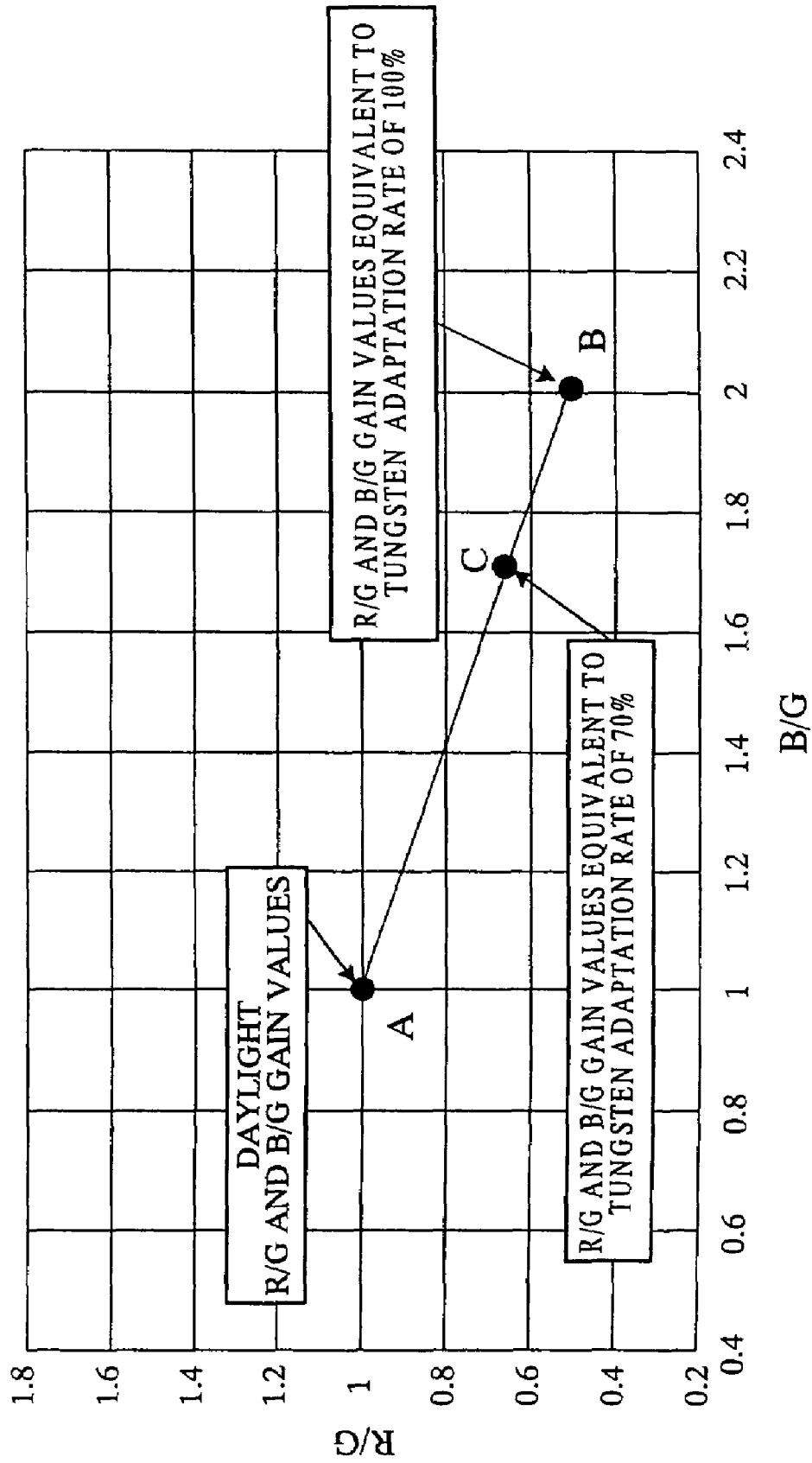
FIG. 3 is a graph useful in describing a white balance adaptation rate set by a camera.

FIG. 3 shows an example of a camera WB adaptation rate used if the photographing light source is tungsten. In this diagram, the axis of abscissas indicates a B/G gain value, while the axis of ordinates indicates an R/G gain value. However, in this graph, both B/G and R/G gain values for day light are normalized to 1 (A point). In FIG. 3, correction with a "gain value equivalent to a tungsten adaptation rate of 100%" (B point), i.e. at R/G=0.5 and B/G=2.0, causes a gray object under a tungsten light source to be photographed in gray (R=G=B).

On the other hand, correction with a "gain value equivalent to a tungsten adaptation rate of 70%" (C point), i.e. at R/G=0.65 and B/G=1.7, causes the gray object under the tungsten light source to be photographed in reddish gray so that the atmosphere of the light source remains in the image.

Thus, the adaptation rate is indicative of the degree to which the atmosphere of the light source is allowed to remain in the image, and is defined by the distance between the gain value for day light (A point) and complete correction point (B point) on the graph. The space defining the color distributions is not limited to the (R/G, B/G) space shown in FIG. 3, but may be an LAB color space or other chromaticity diagrams.

In the case of this example, the adaptation rate is properly set between 100% (complete correction) and 0% (no correction). With an adaptation rate of 100%, white balance is completely established with none of the atmosphere of the light source remaining in the image. If an adaptation rate of 0% is selected, white balance correction is not executed, with the color of the light source output as it is. This is the same as the state in which manual white balance is set to "day light (sunny weather)". As the adaptation rate approaches "0%", more of the atmosphere of the light source remains in the image. On the other hand, as the adaptation rate approaches "100%", less of the atmosphere of the light source remains in the image.

The camera WB adaptation rate may be automatically determined by an automatic white balance (AWB) function of the camera 10 or may be manually arbitrarily set by a camera user. In this embodiment, the AWB adaptation rate can be varied depending on the photographer's taste. In this respect, the adaptation rate may be set step by step or consecutively. Information on the set adaptation rate is recorded on the recording medium 34 together with the image, as additional information in recording images.

Figure 4:
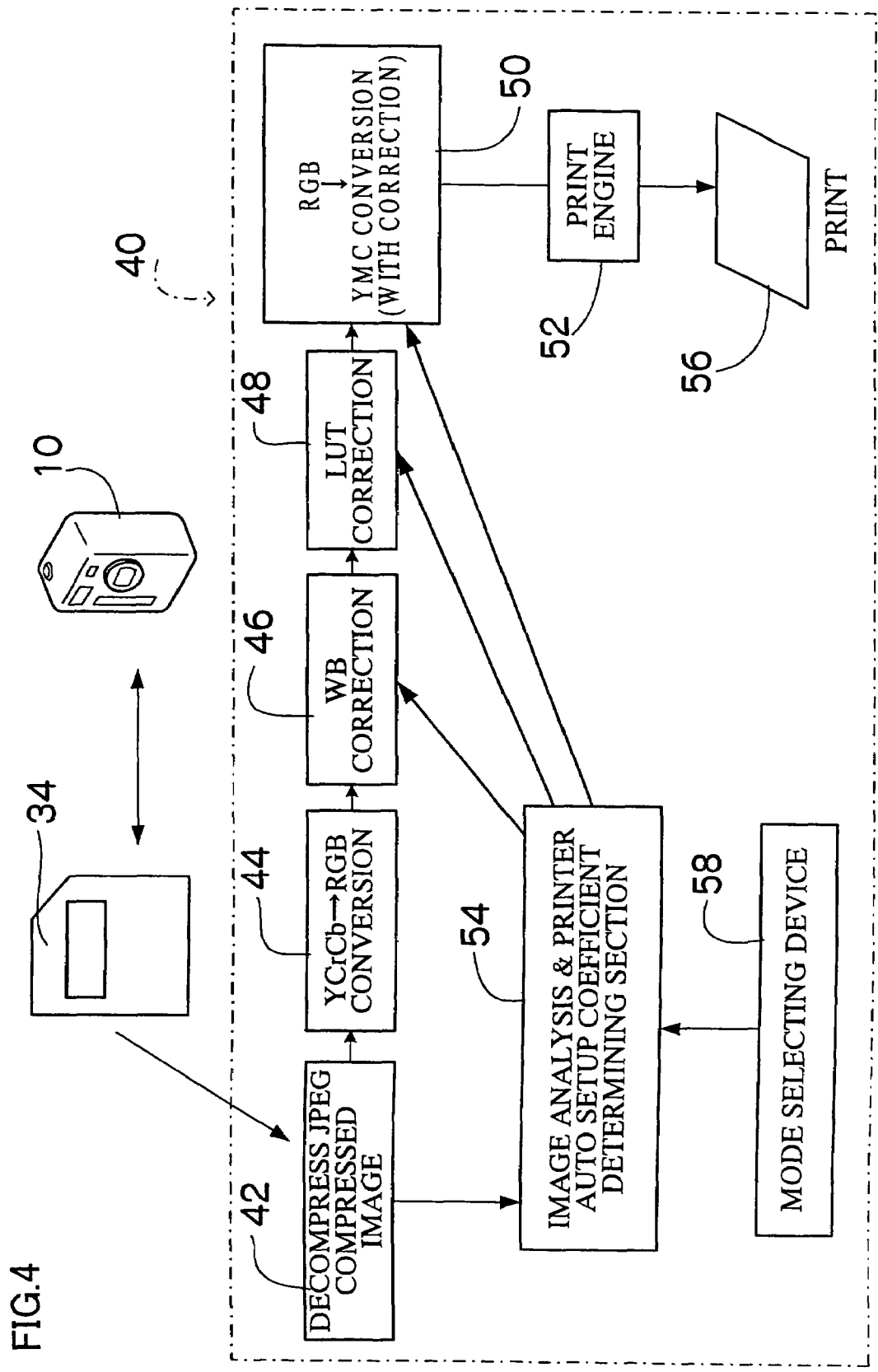
FIG. 4 is a schematic diagram of a system including a printer according to the embodiment of the present invention.

Next, a printer will be described. FIG. 4 is a block diagram of a printer according to an embodiment of the present invention. An image captured by the camera 10 and additional information therefor are delivered by the camera 10 to a printer 40 via a recording medium (removable medium) 34. If an image file is saved to the recording medium inside the camera, a radio or wired data communication device is used to transmit the image and additional information therefor from the camera 10 to the printer 40.

The printer 40 comprises a JPEG compressed image decompressing section 42, Y Cr Cb→RGB conversion circuit (hereinafter referred to as an "RGB conversion circuit") 44, a WB correction circuit 46, a lookup table (LUT) correction circuit 48, an RGB→YMC conversion circuit (hereinafter referred to as a "YMC conversion circuit) 50, a print engine 52, and a control section 54 which control these components.

Image data read into the printer from the recording medium 34 is decompressed by the JPEG compressed image decompressing section 42 and then transmitted to RGB conversion circuit 44. The RGB conversion circuit 44 converts the YC signal into an RGB signal, which is then transmitted to the WB correction circuit 46, which then adjust the gain of each color signal. The control section 54 analyzes the image outputted from the JPEG compressed image decompression section 42, and determines a gain value for each color signal on the basis of the WB adaptation rate information, additional information for the image, to provide gain control signal to the WB correction circuit 46.

Data processed by the WB correction circuit 46 is corrected in the LUT correction circuit 48, and the corrected data is then transmitted to the YMC conversion circuit 50. The YMC conversion circuit 50 converts the received RGB data into a yellow (Y), magenta (M), and cyan (C) color signals. Image data containing the converted YMC signals is transmitted to a print engine 52, which then prints image contents indicated by the image data on a print sheet or another print medium. Thus, print matter 56 with the image contents printed thereon is obtained.

The control section 54 comprises an image analyzing device, a printer auto setup function section, and a coefficient determining section. The control section 54 of the printer 40 reads WB adaptation rate information contained in the additional information for the image so as to execute white balance correction control reflecting the setting for the adaptation rate. For example, a process such as the one shown in (1) to (3) is executed.

(1) Without any additional information on the WB adaptation rate, a normal AWB process is executed. The "normal AWB process", as used herein, refers to a process executed by the printer to correct the white balance of input image data in order to adjust the gain of each color signal so as to obtain such gray (R=G=B) as makes a red (R), green (G), and blue (B) signal levels equal.

(2) If the camera WB adaptation rate is less than 100%, the printer AWB process is turned off. Then, a printing operation is performed on the basis of white balance set by the camera to avoid such correction as negates the atmosphere of the light source. A threshold on the basis of which whether or not to turn off the printer AWB process is determined may be fixed at "100%", which is indicative of complete correction, or may be varied by the user's operation. For example, if the threshold is set at 80%, control is switched so that the printer AWB process is turned off if the camera WB adaptation rate is less than 80% and is executed if the rate is 80% or more.

(3) The amount of AWB correction executed by the printer is calculated using the following Equation <2>:

$$\text{The amount of printer AWB correction} = \text{the normal amount of AWB correction} \times \text{adaptation rate (\%)} / 100 \qquad <2>$$

so that control can be provided such that the AWB correction executed by the printer reflects the contents of the setting for the adaptation rate for the camera. The "normal amount of AWB correction", as used herein, means the amount of white balance correction achieved by the normal AWB process.

The printer 40 shown in FIG. 4 is preferably provided with a "camera adaptation rate neglect mode" in which even when the printer 40 reads the additional information on the WB adaptation rate, it does not execute AWB control reflecting this information but the normal printer AWB process.

That is, the printer 40 has a "camera adaptation rate utilization mode" in which the WB adaptation rate information set by the camera 10 is utilized to execute AWB control, and the "camera adaptation rate neglect mode" in which no adaptation rate information is utilized. The user can properly select either of the modes using a mode selecting device 58. The selection information from the mode selecting device 58 is input to the control section 54, which then switches the AWB control method in accordance with the selected mode.

Figure 5:
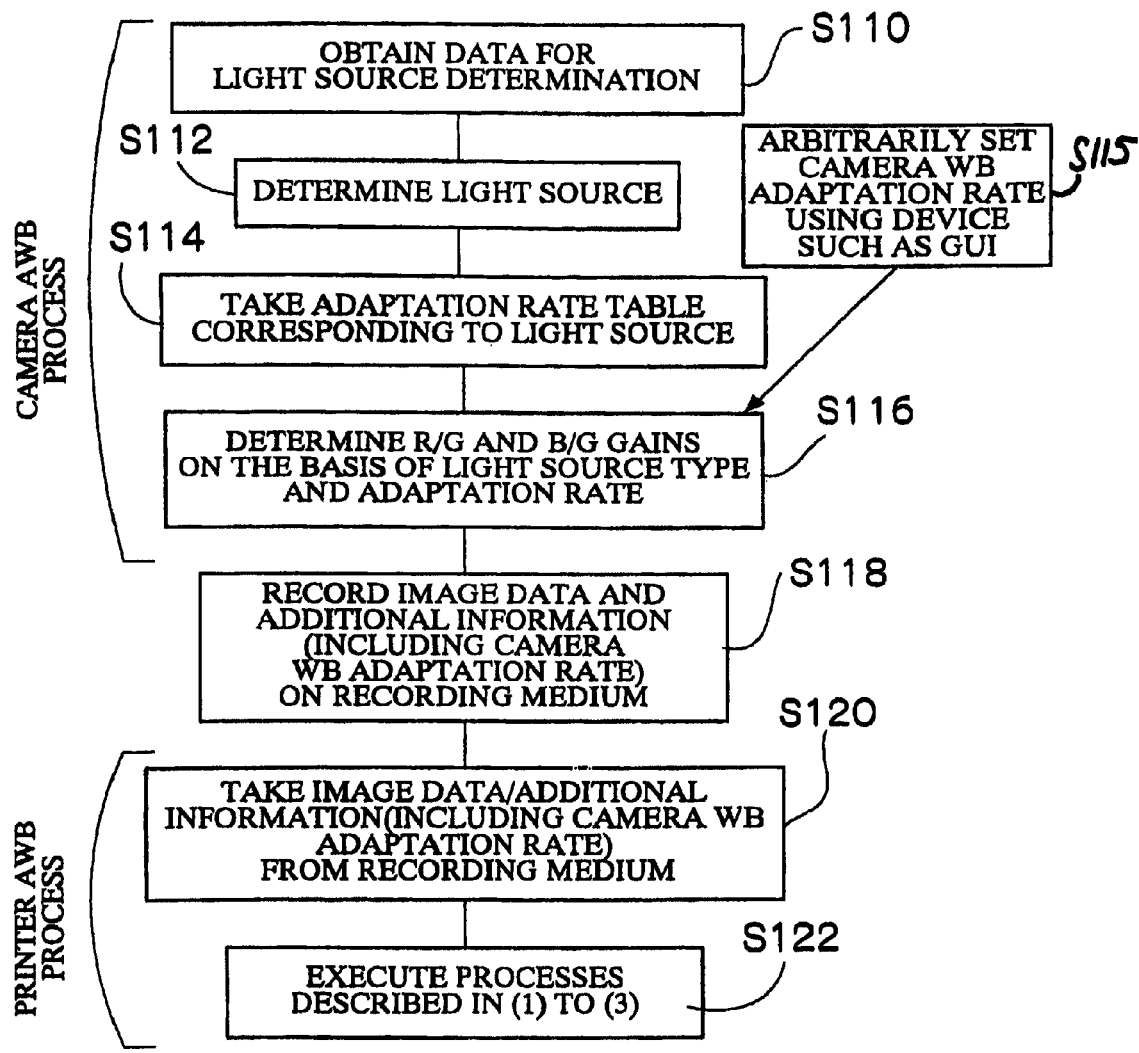
FIG. 5 is a flow chart showing a process procedure of a camera and a printer system according to this example.

FIG. 5 is a flow chart showing a process procedure executed by a system comprising a combination of the camera 10 and printer 40 described above. First, the camera 10 obtains data for light source determination (step S110; only step numbers such as S110 will hereinafter be described) to determine the light source on the basis of the data obtained (S112). Then, the camera 10 takes an adaptation rate table corresponding to the determined light source to determine an R/G gain and a B/G gain on the basis of the type of the light source and the adaptation rate (S116). In this respect, the WB adaptation rate may be set by the camera beforehand as in step S114 or may be arbitrarily set using a device such as a GUI (Graphical User Interface) (S115).

Then, image data obtained in response to depression of the shutter button and additional information therefor (including the camera WB adaptation rate) are recorded on the recording medium 34 (S118). After image-capturing, the recording medium 34 is removed from the camera 10 and then installed in a medium insertion port of the printer 40. The printer 40 takes the image data and the additional information (including the camera WB adaptation rate) from the recording medium 34 (S120). On the basis of the taken image data and additional information, the printer executes an AWB process (one of the processes described above in (1) to (3)) to print the target image (S122).

Now, an explanation will be given of an example in which the present invention is applied to a camera for recording animated images (a movie camera).

To print one scene of an animated image having no additional information on the WB adaptation rate, the printer carries out the normal AWB process. In contrast, to print one scene of an animated image having additional information on the WB adaptation rate, the printer executes a process similar to the above-described printing executed by the camera 10 (electronic still camera).

Figure 6:
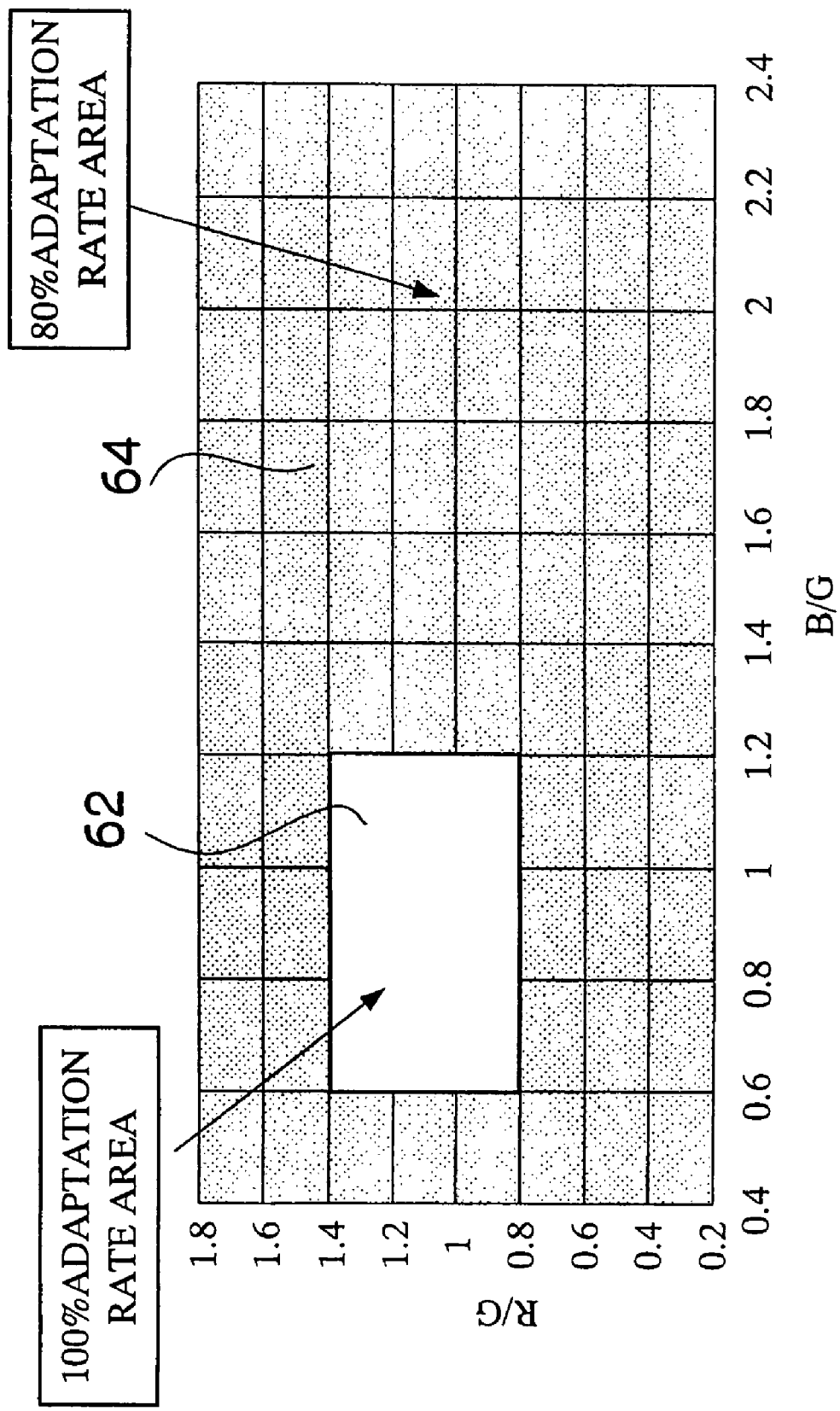
FIG. 6 is a diagram showing an example of a white balance adaptation rate process executed on an animated image.

In addition to a method of estimating a light source type or color temperature and setting a WB adaptation rate on the basis of the estimated light source type or color temperature, white balance adjustment for animated image-capturing may be achieved using the method described below. A WB gain is set so that for the entire screen or a part thereof (for example, a certain area in the middle of the screen), an RGB integrated value or an integrated value for color difference signals indicates gray. In this case, if a WB gain value required to allow the integrated value to indicate gray is within a certain range (a predetermined range), an adaptation rate process is executed such that the WB gain is purposely set at a smaller value. FIG. 6 shows an example. In this drawing, the area shown by reference numeral 62 defines a range set for an adaptation rate of 100%. The other area defines a range set for an adaptation rate of 80%.

For example, if the R and B gains required to achieve complete white balance are 1.1 and 0.9, respectively, they are located inside the area for the adaptation rate of 100% shown by reference numeral 62 in FIG. 6, so that Wb control is executed with an R gain of 1.1 and a B gain of 0.9.

Further, if the R and B gains required to achieve complete white balance are 0.6 and 2.0, respectively, they are located inside the area for the adaptation rate of 80% shown by reference numeral 64 in FIG. 6, so that each gain value is calculated by using Equations <3> and <4> so that WB control is executed with an R again and a B gain that are calculated:

$$R\ gain = 1.0 - (1.0 - 0.6) \times 0.8 = 0.68 \qquad <3>$$

$$B\ gain = 1.0 + (2.0 - 1.0) \times 0.8 = 1.8 \qquad <4>$$

Second Embodiment

Figure 7:
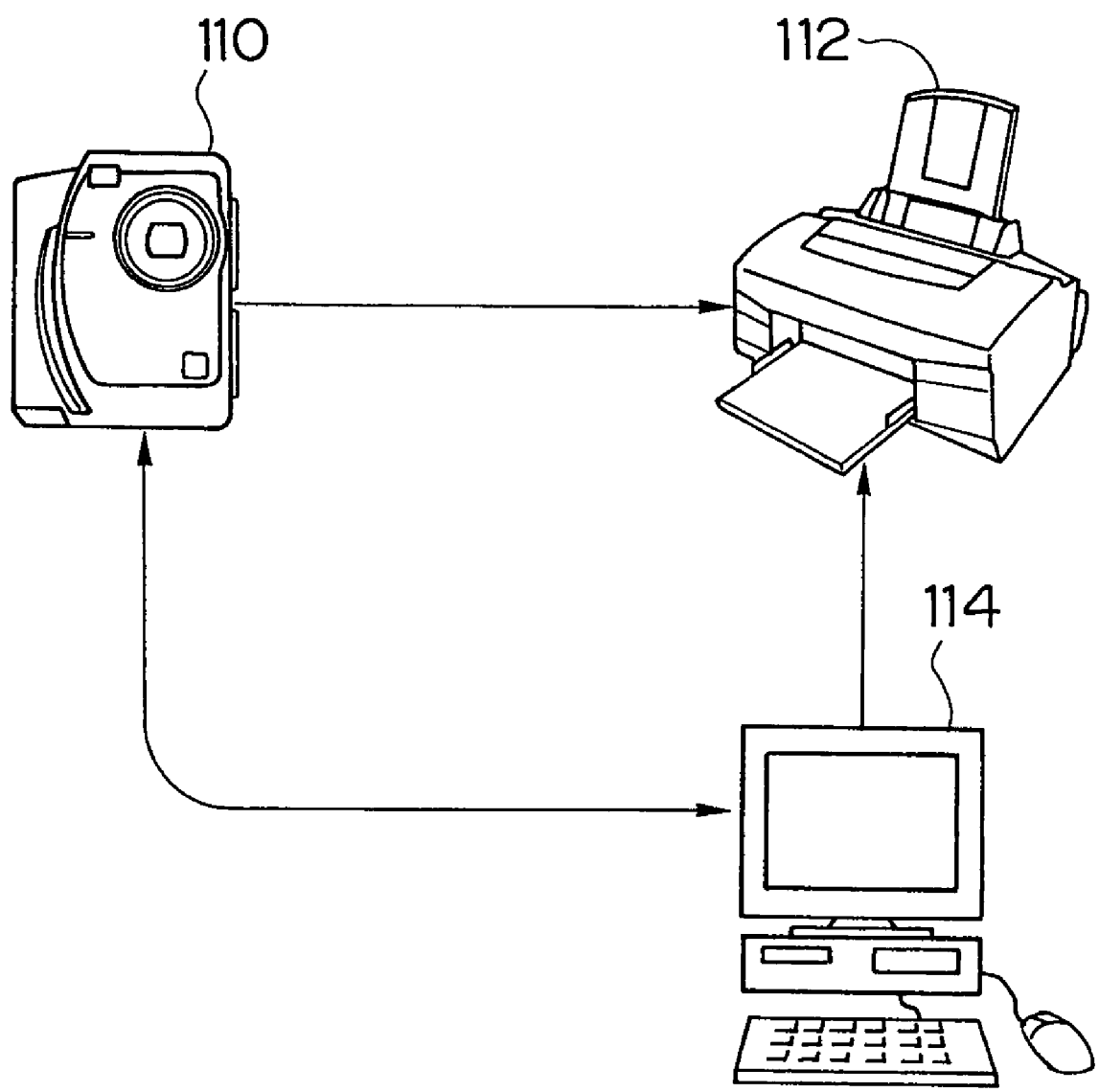
FIG. 7 is a view showing an image processing system according to an embodiment of the present invention.

FIG. 7 shows an image processing system according to an embodiment of the present invention. The image processing system comprises a digital camera 110, a printer 112, and a personal computer 114. The digital camera 110, the printer 112, and the personal computer 114 transmit and receive data to and from each other via a data transmission path. The data transmission path comprises, for example, wire cables such as USBs or radio channels such as Bluetooth. The data transmission path may be a network composed of a plurality of wire cables or radio channels, for example, the Internet. FIG. 7 illustrates a form in which data is transmitted using such a data transmission path, but a recording medium such as a removable medium may be used to transmit data between the digital camera 110 and the printer 112 and the personal computer 114.

The digital camera 110 captures an image of an object and transmits the captured image data to the printer 112 or the personal computer 114. The printer 112 or the personal computer 114 executes a predetermined process on the received image data and outputs the processed data. That is, the printer 112 prints and outputs the image data, and the personal computer 114 outputs the image data to a monitor. Further, the personal computer 114 transmits setting information to the digital camera 110 or the printer 112 to change the setting information for the digital camera 110 or printer 112. In this respect, the digital camera 110 is part of the image pickup device or image processing device according to the present invention, and the printer 112 and the personal computer 114 is an example of an image output device according to the present invention.

Figure 8:
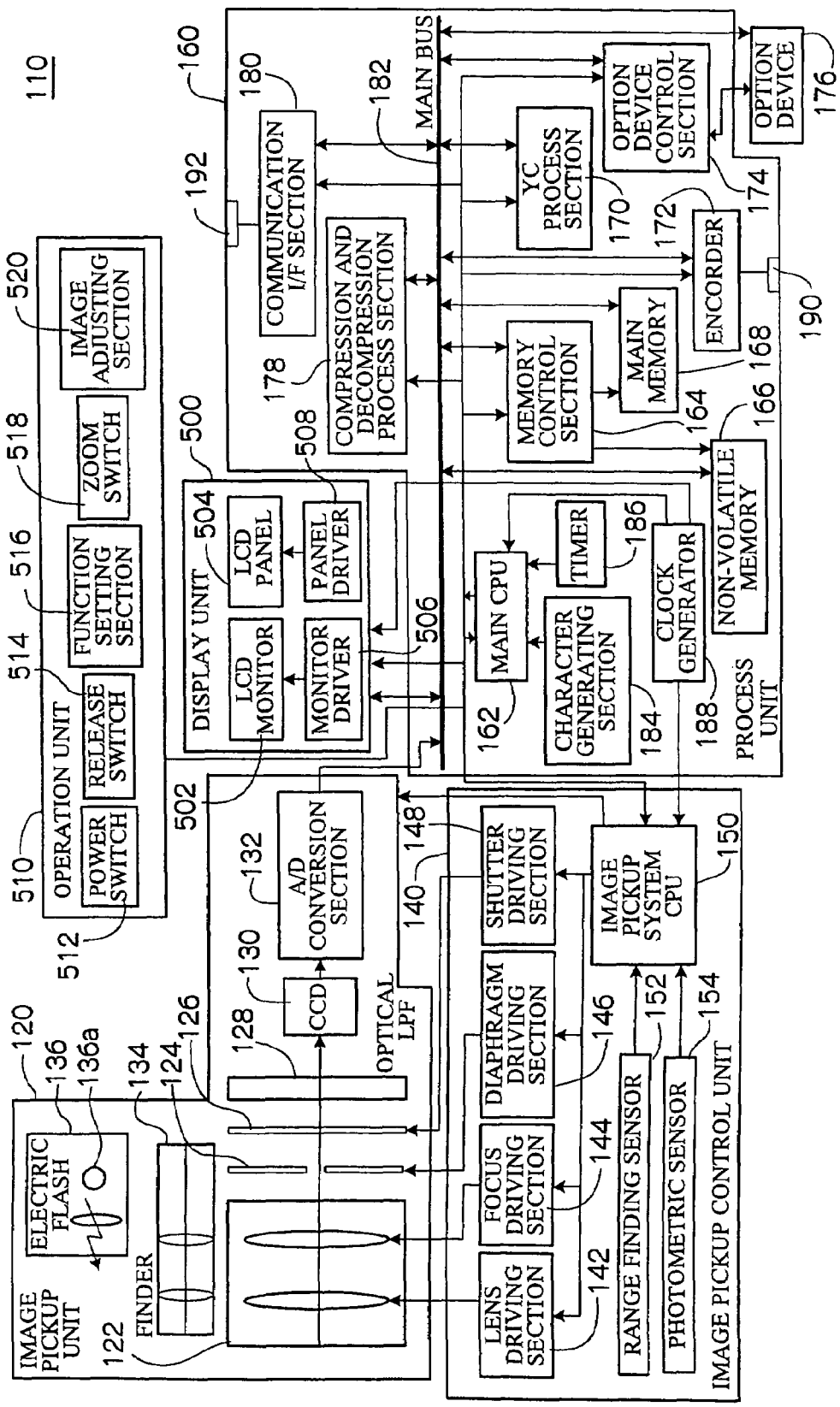
FIG. 8 is a schematic diagram generally showing a digital camera 110 according to this embodiment.

FIG. 8 shows the entire configuration of the digital camera 110 according to this embodiment. The digital camera 110 comprises an image pickup unit 120, an image pickup control unit 140, a processing unit 160, a display unit 500, and an operation unit 510.

The image pickup unit 120 has mechanism members and electric members for image forming and capturing. The image pickup unit 120 has a taking lens 122, which takes and processes an image, a diaphragm 124, a shutter 126, an optical LPF (low pass filter) 128, a CCD 130, and an A/D conversion section 132. The taking lens 122 includes a focus lens, a zoom lens, or the like. This configuration allows an image of an object to be formed on a light receiving surface of the CCD 130, and charges are accumulated in each sensor element of the CCD 130 depending on the quantity of light in the object image formed (these charges will hereinafter be referred to as "accumulated charges"). The accumulated charges are read into a shift register using read gate pulses and are then sequentially read out as voltage signals using register transfer pulses.

The digital camera 110 generally comprises an electronic shutter function and thus does not require a mechanical shutter such as a shutter 126. To realize an electronic shutter function, the CCD 130 is provided with a shutter drain via a shutter gate. When the shutter gate is driven, the accumulated charges are swept out into the shutter drain. Controlling the shutter gate enables the control of the time required to accumulate charges in each sensor element, that is, the shutter speed.

The A/D conversion section 132 divides a voltage signal output by the CCD 130, i.e. an analog signal into an R, G, B color components, subjects the color components to an A/D conversion, and outputs the resulting digital image data to the processing unit 160.

The image pickup unit 120 further has a finder 134 and an electric flash 136. The finder 134 may contain an LCD, and in this case, various information from a main CPU 162 or the like can be displayed in the finder 134. The electric flash 136 emits light when energy stored in a capacitor is supplied to a discharge tube 136*a*.

The image pickup control unit 140 has a lens driving section 142, a focus driving section 144, a diaphragm driving section 146, a shutter driving section 148, an image pickup system CPU 150 which controls these sections, a range finding sensor 152, and a photometric sensor 154. The lens driving section 142, the focus driving section 144, the diaphragm driving section 146, and the shutter driving section 148 each have a drive device such as a stepping motor. The range finding sensor 152 measures the distance to the object in response to depression of a release switch 514, and the photometric sensor 154 measures the luminance of the object. Measured distance data (hereinafter simply referred to as "range finding data") and object luminance data (hereinafter simply referred to as "photometric data") are transmitted to the image pickup system CPU 150. On the basis of photographing information such as a zoom scale which is specified by the user, the image pickup system CPU 150 controls the lens driving section 142 and the focus driving section 144 to adjust the zoom scale and focus of the taking lens 122.

The image pickup system CPU 150 determines an aperture value and a shutter speed on the basis of RGB digital signal integrated values for one image frame, that is, AE information. The diaphragm driving section 146 and the shutter driving section 148 adjusts the aperture and opens and closes the shutter 126 on the basis of the determined aperture value and shutter speed.

Further, the image pickup system CPU 150 controls light emission from the electric flash 136 on the basis of photometric data and simultaneously adjusts the aperture. When the user instructs an image to be captured, the CCD 130 starts accumulating charges, and after the shutter time calculated from the photometric data, outputs the accumulated charges to the A/D conversion section 132.

The processing unit 160 has a main CPU 162 which controls the entire digital camera 110, particularly the processing unit 160 itself, a memory control section 164 controlled by the main CPU 162, a YC processing section 170, an option device control section 174, a compression and decompression process section 178, and a communication I/F section 180. The main CPU 162 transmits and receives required information to and from the image pickup system CPU 150 by serial communication or the like. Operation clocks for the main CPU 162 are provided by a clock generator 188. The clock generator 188 provides clocks of different frequencies to the image pickup system CPU 150 and to the display unit 500.

A character generating section 184 and a timer 186 are annexed to the main CPU 162. The timer 186 is backed up by batteries to always count the date and time and to provide the main CPU 162 with information on the capturing date and time and other temporal information based on the count value. The character generating section 184 generates text information such as the capturing date and time and a title, and this text information is properly synthesized with a captured image.

The memory control section 164 controls a non-volatile memory 166 and a main memory 168. The non-volatile memory 166 is composed of an EEPROM, a flash memory, or the like to store data such as the user's setting information and pre-shipment adjustment values which is to be retained even when the power to the digital camera 110 is turned off. The non-volatile memory 166 may store a boot program, a system program, or the like for the main CPU 162. The main memory 168 has a function of acting as a frame memory which stores data output by the image pickup unit 120, a function of acting as a system memory to take various programs, and a function of acting as a work area. The non-volatile memory 166 and the main memory 168 transmit and receive data to and from components arranged inside and outside the processing unit 160, via a main bus 182.

The YC processing section 170 subjects YC conversion to image data to generate a luminance signal Y and color difference (chroma) signals B-Y and R-Y. The memory control section 164 stores the luminance signal and color difference signals in the main memory 168. The compression and decompression process section 178 sequentially reads out the luminance signal and the color difference signals from the main memory 168 for compression. The option device control section 174 writes the compressed data to a memory card, a type of option device 176.

The processing unit 160 further has an encoder 172. The encoder 172 receives the luminance signal and color difference signals as input, converts these signals into a video signal (an NTSL or PAL signal), and outputs this video signal from a video output terminal 190. To generate a video signal from data recorded on the option device 176, this data is provided to the compression and decompression process section 178 via the option device control section 174. Then, the data is subjected to a required decompression process by the compression and decompression process section 178 and is then converted into a video signal by the encoder 172.

On the basis of a signal specification accepted by the option device 176 and a bus specification for the main bus 182, the option device control section 174 generates signals required between the main bus 182 and the option device 176 and subjects these signals to logical conversion or voltage conversion. In addition to the memory card, the digital camera 110 may support a standard I/O card conforming to, for example, the PCMCIA, as the option device 176. In this case, the option device control section 174 may include a PCMCIA bus control LSI or the like.

The communication I/F section 180 provides control such as protocol conversion in accordance with a communication specification such as USB, RS-232C, or Ethernet which is supported by the digital camera 110. The communication I/F section 180 includes a driver IC as required and communicates with external equipment including a network, via a connector 192. Rather than having such a standard configuration, the communication I/F section 180 may be constituted to transmit and receive data to and from external equipment such as a printer, a karaoke machine, or a game machine, using a dependent I/F.

The display unit 500 has an LCD monitor 502 and an LCD panel 504. The LCD monitor 502 is controlled by a monitor driver 506 as an LCD driver. Further, the LCD panel 504 is controlled by a panel driver 508. The LCD monitor 502 has a size of, for example, 2 inches and is installed on the rear surface of the camera to display the current image-capturing or play mode, an image-capturing or reproduction zoom scale, the remaining level of the batteries, the date and time, a mode setting screen, an object image, or the like. The LCD panel 504 is, for example, a small black-and-white LCD installed on the top surface of the camera to simply display information such as image quality (FINE/NORMAL/BASIC or the like), electric flash emission allowed/inhibited, the standard number of images that can be captured, the number of pixels, and the capacity of the batteries.

The operation unit 510 has mechanism and electric members required for the user to set or specify the operation of the digital camera 110, the mode of the operation, or the like. A power switch 512 determines whether to turn on or off the power to the digital camera 110. A release switch 514 has a two-stage depression structure including a half depression and a full depression. For example, the half depression locks an AF and AE functions, and the full depression causes an image to be captured, so that the image is then recorded in the main memory 168, the option device 176, or the like after being subjected to required signal processing, data compression, or the like. The operation unit 510 may accept settings made using the above switches, a rotary dial, a cross key, and others, which are collectively referred to as a function setting section 516 in FIG. 8. Further, an image adjusting section 520 accepts adjustment of the chromaticity or brightness of an image displayed on the LCD monitor 502. The user can adjust the chromaticity or brightness of the image while viewing the image displayed on the LCD monitor 502. The operation or function which can be specified using the operation unit 510 includes a "file format", "special effects", "print", "enter/save", and "display switching". A zoom switch 518 determines a zoom scale.

A main operation performed using the above-described configuration will be described below. First, the power switch 512 of the digital camera 110 is turned on to supply power to each section of the camera. The main CPU 162 takes the state of the function setting section 516 to determine whether the digital camera 110 is in an image-capturing mode or a reproduction mode.

When the camera is in the image-capturing mode, the main CPU 162 monitors the half depression state of a release switch 514. When the half depression state is detected, the main CPU 162 obtains photometric data and range finding data from the photometric sensor 154 and range finding sensor 152. On the basis of the data obtained, the image pickup control unit 140 is operated to adjust the focus and aperture of the taking lens 122 or the like. Once the adjustment is completed, the characters "standby" or the like are displayed on the LCD monitor 502 to notify the user of this state. Subsequently, the main CPU 162 monitors a full depression state of the release switch 514. When the release switch 514 is fully depressed, the shutter 126 is closed to sweep the charges accumulated in the CCD 130 out into the A/D conversion section 132. Digital image data generated as a result of a process executed by the A/D conversion section 132 is output to the main bus 182. Image data output by the A/D conversion section 132 is stored in the main memory 168, then processed by the YC process section 170 and the compression and decompression process section 178, and subsequently recorded in the option device 176 via the option device control section 174. The recorded image is displayed on the LCD monitor 502 in a frozen state, so that the user can view the captured image. Then, the series of image-capturing operations are completed.

On the other hand, if the digital camera is in the reproduction mode, the main CPU 162 reads the last captured image out from the main memory 168 via the memory control section 164, and displays this image on the LCD monitor 502 of the display unit 500. In this state, when the user instructs "forward feeding" or "reverse feeding" using the function setting section 516, the image captured before or after the currently displayed image is read out and displayed on the LCD monitor 502. Then, the user operates the image adjusting section 520 to adjust the chromaticity or brightness of the image displayed on the LCD monitor 502.

Figure 9:
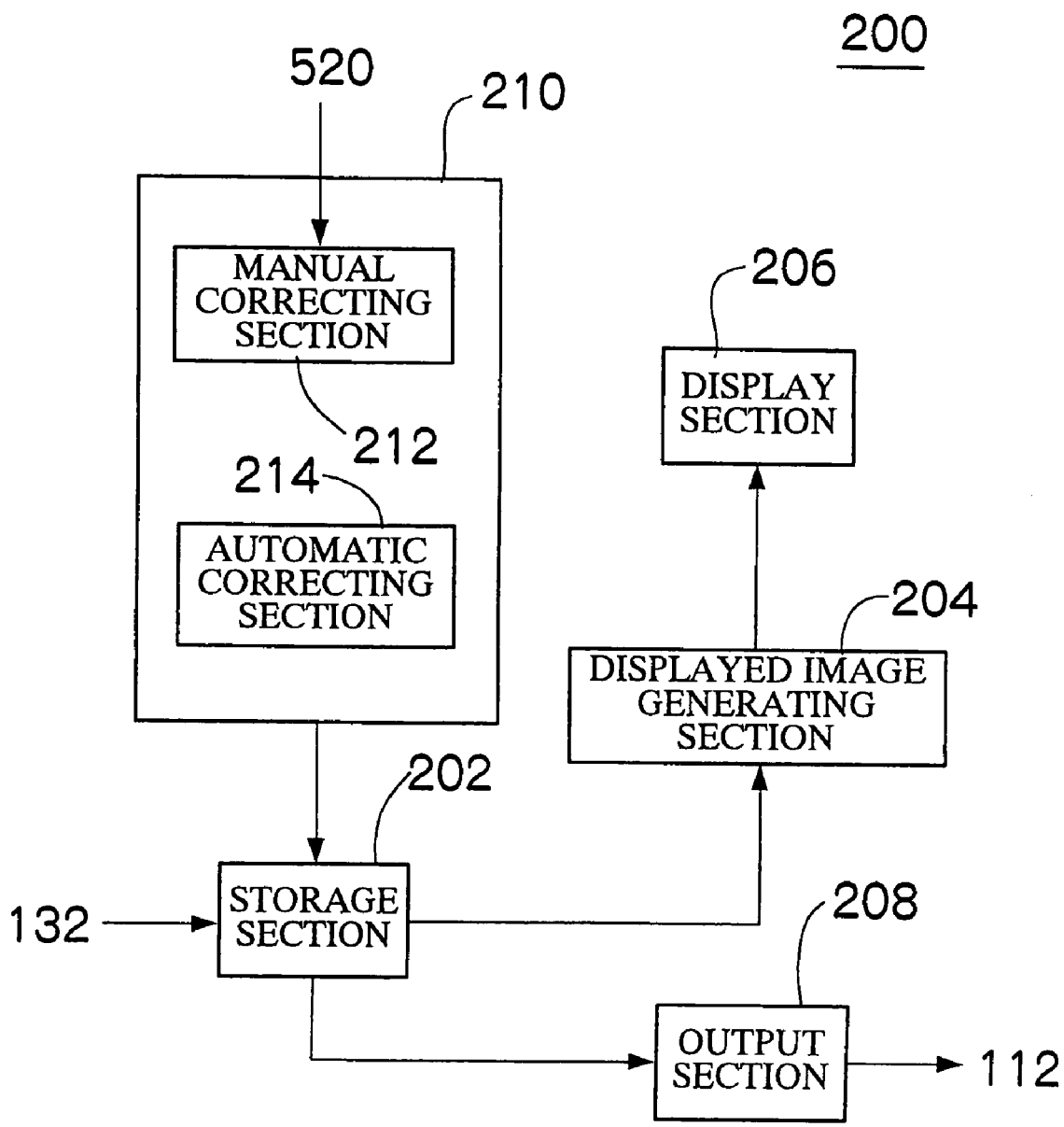
FIG. 9 is a diagram showing an example of a configuration of functions of an image processing unit 200.

FIG. 9 shows an example of the configuration of the functions of the image processing unit 200. The image processing unit 200 comprises a storage section 202, a displayed image generating section 204, a display section 206, an output section 208, and a correcting section 210. The correcting section 210 has a manual correcting section 212 and an automatic correcting section 214.

For example, the image processing unit 200 is realized by the cooperation between a program stored or taken in the non-volatile memory 166 or main memory 168 and the main CPU 162. The main CPU 162 may have a built-in memory which may store required programs to actualize the functions as firmware. Although FIG. 9 shows that the functions of the image processing unit 200 are integrated together, these functions are not necessarily physically integrated together. For example, the main CPU 162, the non-volatile memory 166, or the main memory 168 may have the functions of the storage section 202. Alternatively, the display unit 500 may have the functions of the displayed image generating section 204 and display section 206. Alternatively, the communication I/F section 180, the encoder 172, or the option device control section 174 may have the functions of the output section 208. In either case, the digital camera 110 may be considerably freely designed so as to actualize the functions of the image processing unit 200.

The storage section 202 stores image data received from the A/D conversion section 132. The correcting section 210 corrects the chromaticity or brightness of an image on the basis of the image data stored in the storage section 202. Then, the storage section 202 stores information on image correction executed by the correcting section 210 in association with the image data.

The automatic correcting section 214 corrects the image data stored in the storage section 202, on the basis of a predetermined amount of correction. For example, the automatic correcting section 214 corrects the image on the basis of a white balance adaptation rate based on a pre-shipment setting or the user's setting.

The white balance adaptation rate is a value indicative of the balance between the red signal R and the green signal G and the blue signal B. The white balance adaptation rate is expressed by K1 and K2 defined by the following equations <5> and <6>:

$$K_1 = (IR/IG) \qquad <5>;$$

$$K_2 = (IB/IG) \qquad <6>;$$

using an integrated value IR for red signals R in a predetermined field, an integrated value IG for green signals G in the predetermined field, and an integrated value IB for blue signals B in the predetermined field. That is, K1 is a ratio of the integrated value IR to the integrated value IG, and K2 is a ratio of the integrated value IB to the integrated value IG.

The manual correcting section 212 corrects the image indicated by the image data stored in the storage section 202, on the basis of the user's operation of the image adjusting section 520. For example, while viewing the image displayed on the display section 206, the user operates the image adjusting section 520 to adjust the white balance or chromaticity of the image. Then, the manual correcting section 212 corrects the white balance or brightness of the image on the basis of the user's operation of the image adjusting section 520.

The storage section 202 stores the amount of correction executed by the automatic correcting section 214, as information on correction of the image in association with the image data. For example, the storage section 202 stores a white balance adaptation rate as an example of the amount of correction executed by the automatic correcting section 214. The storage section 202 also stores information indicating whether or not the manual correcting section 212 has executed correction, as information on correction of the image and in association with the image data. Alternatively, the storage section 202 may store the amount of correction executed by the manual correcting section 212, as information on correction of the image and in association with the image data.

The output section 208 associate the image data stored in the storage section 202 with the information on correction of the image indicated by the image data to output the resultant data to an external image processing device such as the printer 112. Specifically, the output section 208 adds the information on correction of the image to the image data as tag information to output the resultant data, the information on correction of the image being the amount of correction executed by the automatic correcting section 214 or the information indicating whether or not the manual correcting section 212 has executed correction.

Alternatively, the storage section 202 may store, in association with the image data, information indicting whether or not the printer 112, an example of the external image processing device, is to correct the image. For example, if the manual correcting section 212 has corrected the image, the storage section 202 may store, as information on correction of the image, information indicating to the printer 112 that the image is inhibited from being corrected.

The storage section 202 may store image data obtained from the A/D conversion section 132 or the image data on the image corrected by the correcting section 210. Then, the output section 208 may output the image data obtained from the A/D conversion section 132 by the storage section 202 to the printer 112 or may output the image data on the image corrected by the correcting section 210 to the printer 112.

Alternatively, the display section 206 as an example of a confirming section of the present invention may display the image corrected by the automatic correcting section 214. Then, the manual correcting section 212 as an example of a determining section of the present invention may determine whether or not the user has confirmed the image displayed on the display section 206 on the basis of the user's operation. Further, if the user has confirmed the image, the storage section 202 may store, as information on correction of the image, information indicating to the printer 112 that the image is inhibited from being corrected. Furthermore, the output section 208 may add the information indicating to the printer 112 that the image is inhibited from being corrected, that is, information on correction of the image, to the image data as tag information to output the resultant data.

The displayed image generating section 204 generates an image displayed by the display section 206, on the basis of the image indicated by the image data stored in the storage section 202. Then, the user operates the image adjusting section 520 while viewing the image displayed in the display section 206, to adjust the chromaticity or brightness of the image. The manual correcting section 212 corrects the image displayed by the display section 206, on the basis of the user's operation of the image adjusting section 520. Then, the storage section 202 stores the contents of the correction executed by the manual correcting section 212, in association with the image data on the image displayed by the display section 206.

The displayed image generating section 204 may generate an image displayed by the display section 206, by extracting a partial area of the image indicated by the image data. Alternatively, the displayed image generating section 204 may generate an image displayed by the display section 206, by extracting and enlarging a partial area of the image indicated by the image data and synthesizing the enlarged partial area with the image indicated by the image data.

Figure 10A:
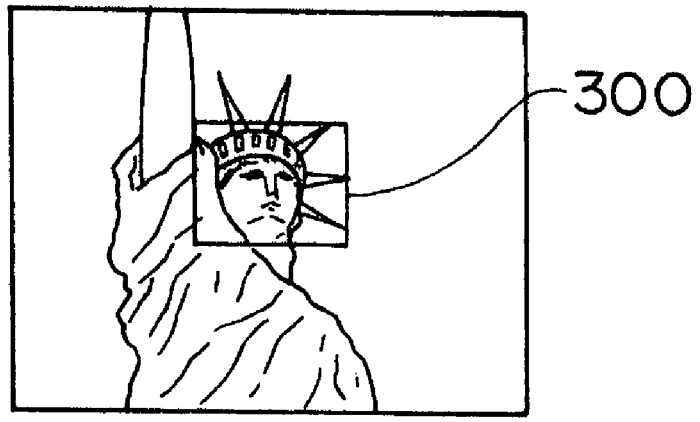
FIGS. 10(a), 10(b) and 10(c) are views showing examples of screens displayed by a display section 206.
Figure 10B:
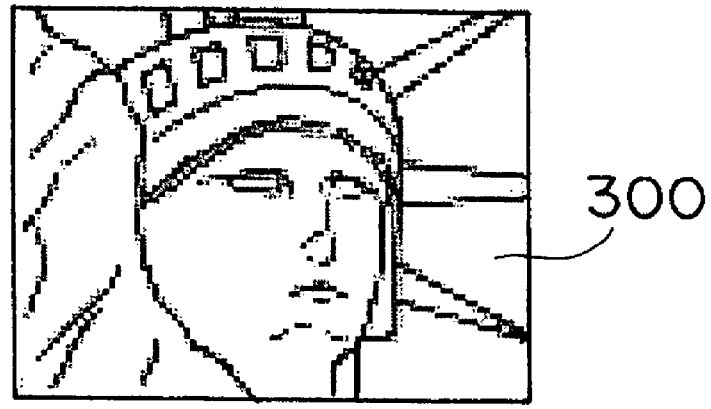
Figure 10C:
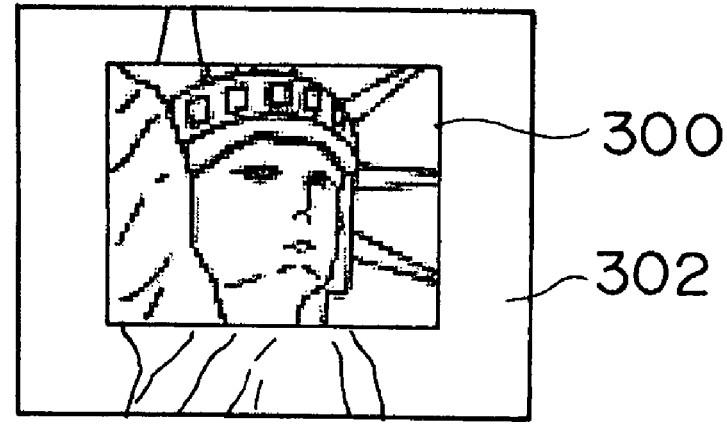

FIGS. 10(a), 10(b) and 10(c) are views showing examples of screens displayed by the display section 206. The displayed image generating section 204 converts an image indicated by image data selected by the user into an image displayed by the display section 206. Then, as shown in FIG. 10(a), the display section 206 displays the displayed image. The displayed image generating section 204 may generate a displayed image by reducing the resolution of the image indicated by the image data.

Further, in the displayed screen shown in FIG. 10(a), the user selects a partial area 300 of the image. Then, the displayed image generating section 204 extracts and enlarges the user's selected partial area 300 of the image to generate a displayed image. Then, as shown in FIG. 10(b), the display section 206 displays the displayed image generated by the displayed image generating section 204. Then, the user can adjust the chromaticity or brightness of the entire image while viewing the enlarged partial area 300.

Alternatively, the displayed image generating section 204 may generate a displayed image by extracting and enlarging the user's selected partial area of the image and synthesizing the enlarged partial area with the image indicated by the image data. Then, as shown in FIG. 10(c), the display section 206 displays the displayed image generated by the displayed image generating section 204. Then, the user can adjust the chromaticity or brightness of the image while viewing the enlarged partial area 300 and the other area 302. If the chromaticity or brightness of the partial area 300 is to be adjusted, this display function of the display section 206 enables the user to adjust the chromaticity or brightness of the partial area 300 while checking a change in chromaticity or brightness of the other area 302.

Figure 11:
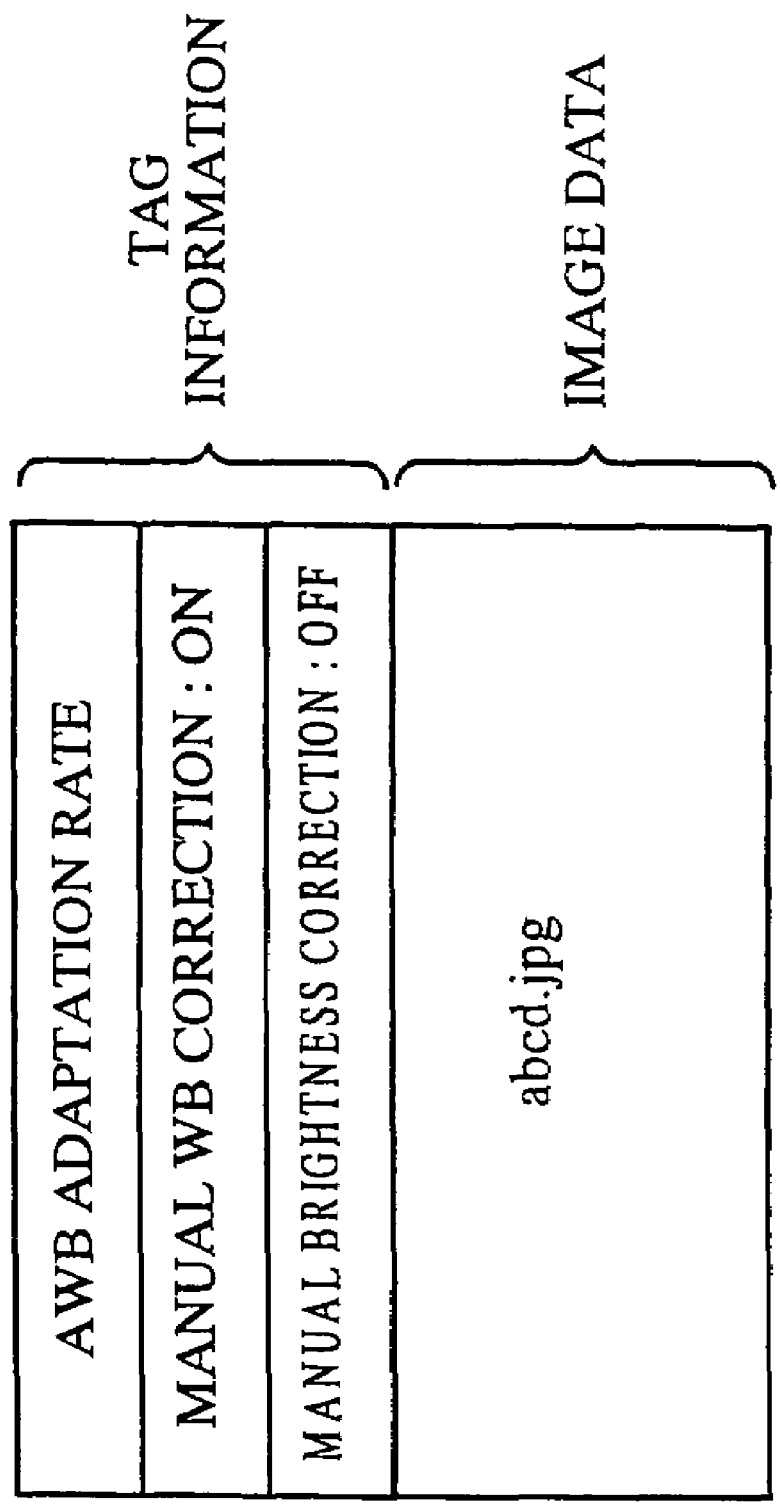
FIG. 11 is a diagram showing an example of a format of data output by an output section 208.

FIG. 11 shows an example of a format of data output by the output section 208. The data output by the output section 208 has tag information and image data. As information on correction of the image, the tag information indicates, for example, the white balance adaptation rate of the automatic correcting section 214 (AWB adaptation rate), information indicating whether or not the manual correcting section 212 has executed white balance correction (manual WB correction), and information indicating whether or not the manual correcting section 212 has corrected chromaticity (manual chromaticity correction). Further, the image data is of, for example, the JPEG format.

Figure 12:
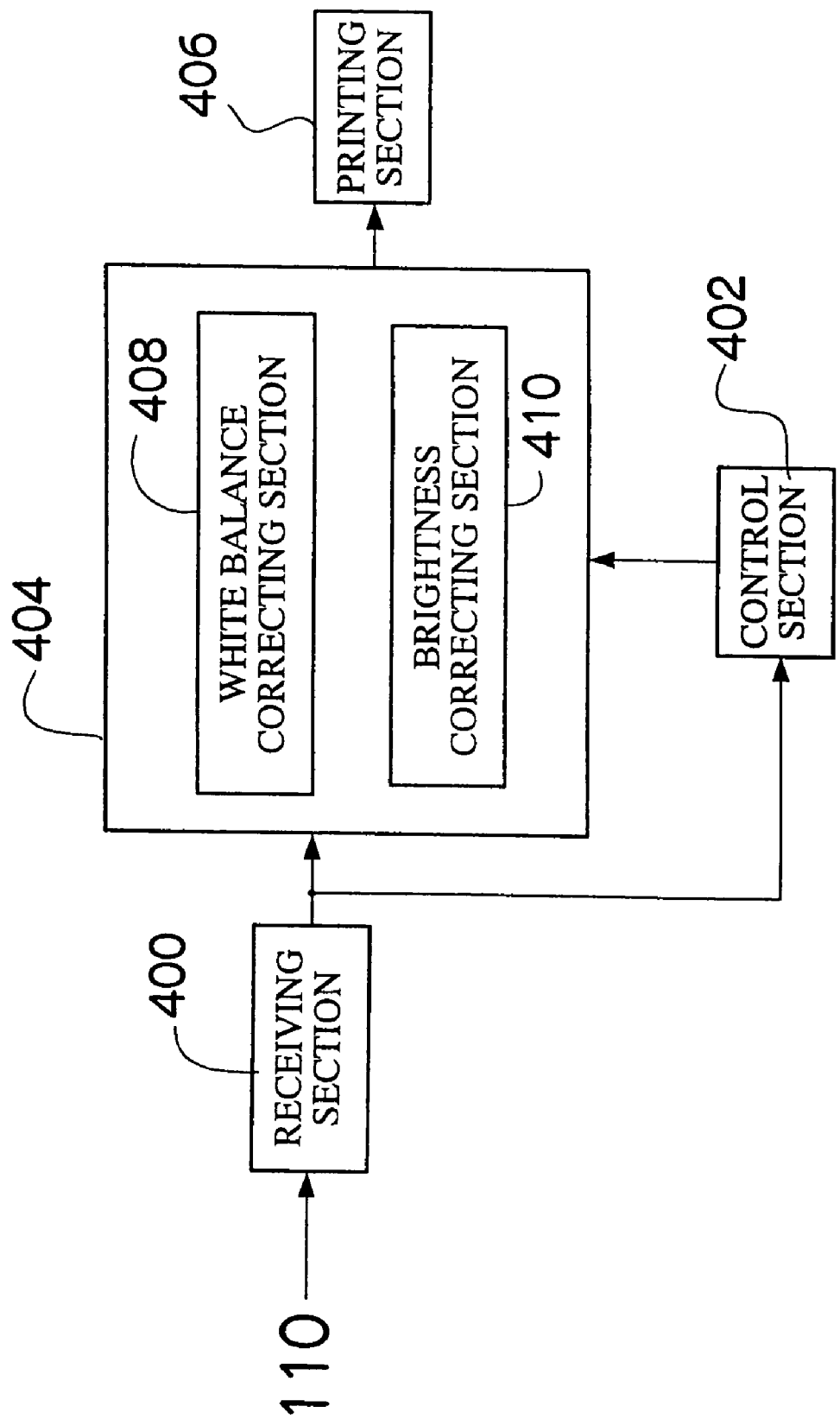
FIG. 12 is a diagram showing a configuration of functions of a printer 112 according to this embodiment.

FIG. 12 shows the configuration of the functions of the printer 112 according to this embodiment. The printer 112 comprises a receiving section 400, a control section 402, a processing section 404, and a printing section 406. The processing section 404 has a white balance correcting section 408 and a brightness correcting section 410.

The receiving section 400 receives tag information from the digital camera 110, the information including image data indicative of an image and information on correction of the image. Then, the control section 402 analyzes the tag information received by the receiving section 400, and on the basis of the information on correction of the image, controls image processing executed by the processing section 404, which processes the image received by the receiving section 400. Then, the processing section 404 processes the image under the control of the control section 402. Then, the printing section 406 prints the image processed by the processing section 404.

For example, the receiving section 400 receives, as information on correction of the image, tag information containing information indicating whether or not the image has been corrected on the basis of the user's operation. Then, if the tag information received by the receiving section 400 indicates that the image has been corrected on the basis of the user's operation, the control section 402 inhibits the processing section 404 from processing the image.

Alternatively, the receiving section 400 may receive, as information on correction of the image, information indicative of the white balance adaptation rate of the image. Then, if the white balance adaptation rate has a predetermined value, the control section 402 may inhibit adjustment of white balance carried out as image processing executed by a white balance correcting section 408 of the processing section. For example, if the white balance adaptation rate is not 1, the control section 402 may inhibit the adjustment of the white balance carried out as image processing executed by the white balance correcting section 408 of the processing section. If the user captures an image of the setting sun and avoids setting the white balance adaptation rate at 1 in order to allow the setting sun to appear reddish in the captured image, then by inhibiting the adjustment of the white balance executed by the white balance correcting section 408, the printing section 406 can print an image to please the user.

FIGS. 13(a) and 13(b) are diagrams showing examples of data formats of determination tables provided in the control section 402. FIG. 13(a) shows a WB correction determination table used to determine whether or not the white balance correcting section 408 of the processing section 404 is to correct the white balance of the image. The WB correction determination table contains the white balance adaptation rate of the automatic correcting section 214 (AWB adaptation rate), information indicating whether or not the manual correcting section 212 of the digital camera 110 has executed white balance correction (manual WB correction), the need for the printer 112 to correct the white balance (printer WB correction), and information indicating whether or not the printer 112 is to correct white balance (printer WB correction).

As shown in FIG. 13(a), if the manual WB correction has been turned on, i.e. the manual correcting section 212 of the digital camera 110 has corrected the white balance, then to give top priority to the user's adjustment notwithstanding the fact whether or not the printer WB correction is required, the control section 402 inhibits the white balance correcting section 408 from correcting the white balance of the image. On the other hand, if the AWB adaptation rate is not 1, then to give top priority to the adjustment executed by the digital camera 110 notwithstanding the fact whether or not the printer WB correction is required, the control section 402 inhibits the white balance correcting section 408 from correcting the white balance of the image.

Further, FIG. 13(b) shows a brightness correction determination table used by the brightness correcting section 410 of the processing section 404 to determine whether or not to correct the brightness of the image. The brightness correction determination table contains information indicating whether or not the manual correction section 212 of the digital camera 110 has corrected the brightness (manual brightness correction), the need for the printer 112 to correct the brightness, and information indicating whether or not the printer 112 is to correct the brightness (printer brightness correction).

As shown in FIG. 13(b), if the manual brightness correction has been turned on, i.e. the manual correcting section 212 of the digital camera 110 has corrected the brightness, then to give top priority to the user's adjustment notwithstanding the fact whether or not the printer brightness correction is required, the control section 402 inhibits the brightness correcting section 410 from correcting the brightness.

Figure 14:
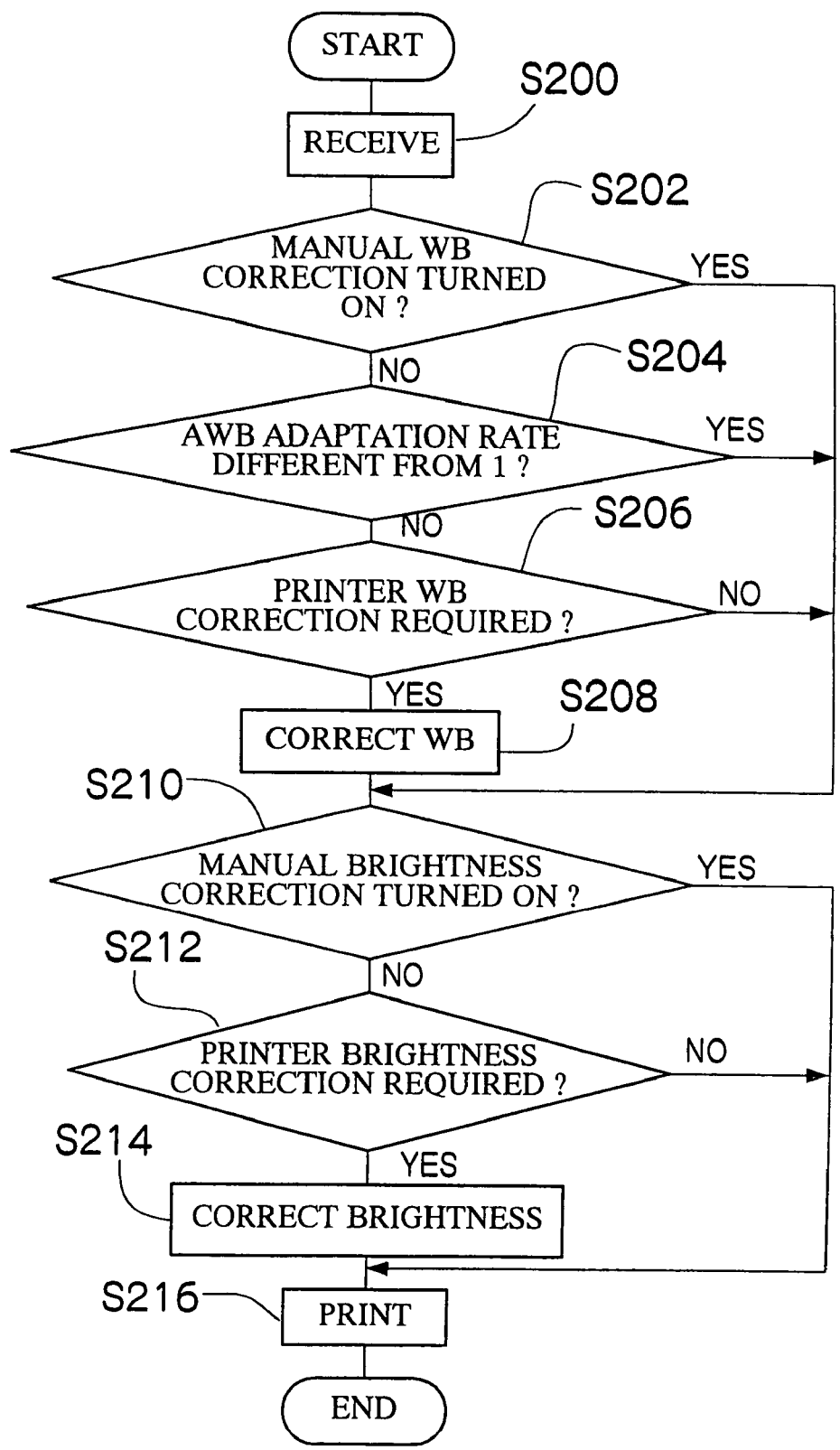
FIG. 14 is a flow chart of an example of an image processing method executed by the printer 112.

FIG. 14 is a flow chart showing an example of an image processing method executed by the printer 112. First, the receiving section 400 receives tag information from the digital camera, the information including image data indicative of an image and information on correction of the image (S200). Then, the control section 402 analyzes the tag information received by the receiving section 400 to determine whether or not the manual WB correction has been turned on, i.e. the manual correcting section 212 of the digital camera 110 has corrected the white balance (S202). If the control section determines at step S202 that the manual WB correction has been turned on, the process proceeds to step S210. If the control section determines at step S202 that the manual WB correction has been turned off, the process proceeds to step S204.

Next, the control section 402 determines whether or not the ABW adaptation rate is different from 1, i.e. whether or not the white balance adaptation rate of the automatic correction section 214 of the digital camera 110 is different from 1 (S204). If the control section 402 determines at step S204 that the ABW adaptation rate is different from 1, the process proceeds to step S210. If the control section 402 determines at step S204 that the ABW adaptation rate is not different from 1, the process proceeds to step S206.

Then, the control section 402 determines whether or not the printer WB correction is required, on the basis of the image indicated by the image data received by the receiving section 400, i.e. whether or not the printer 112 must correct the white balance (S206). If the control section 402 determines at step S206 that the printer WB correction is not required, the process proceeds to step S210. If the control section 402 determines at step S206 that the printer WB correction is required, the white balance correcting section 408 of the processing section 404 corrects the white balance of the image indicated by the image data received by the receiving section 400 (S208).

Next, the control section 402 determine whether or not the manual brightness correction has been turned on, i.e. the manual correcting section 212 of the digital camera 110 has corrected the brightness (S210). If the control section determines at step S210 that the manual brightness correction has been turned on, the process proceeds to step S216. If the control section determines at step S210 that the manual brightness correction has been turned off, the process proceeds to step S212.

Then, the control section 402 determines whether or not the printer brightness correction is required, on the basis of the image indicated by the image data received by the receiving section 400, i.e. whether or not the printer 112 must correct the brightness (S212). If the control section 402 determines at step S212 that the printer brightness correction is not required, the process proceeds to step S216. If the control section 402 determines at step S212 that the printer brightness correction is required, the brightness correcting section 410 of the processing section 404 corrects the brightness of the image indicated by the image data received by the receiving section 400 (S214).

Next, the printing section 406 prints the processed image (S216). Then, the flow chart of the image processing method executed by the printer 112 according to this example is completed.

Figure 15:
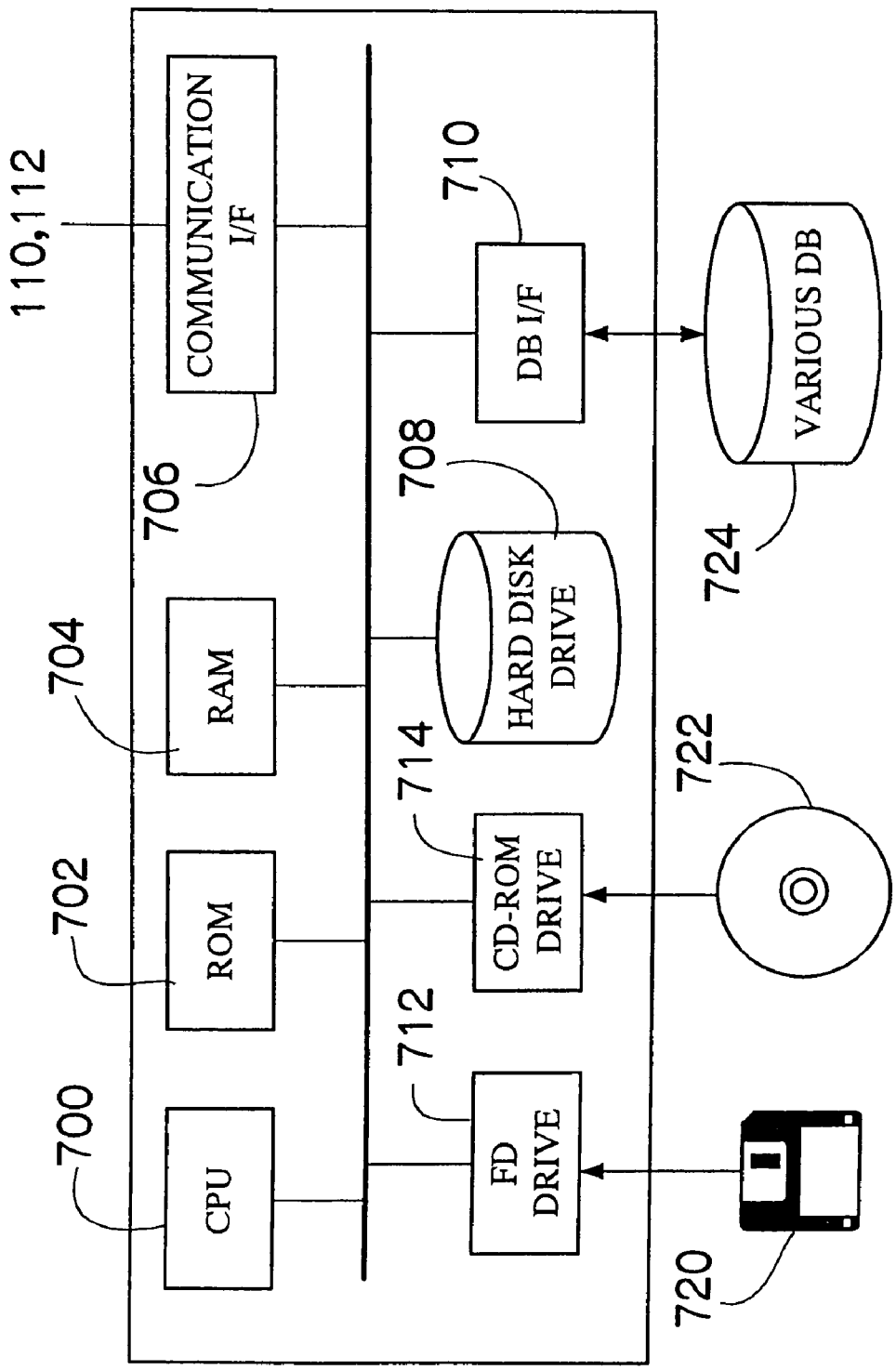
FIG. 15 is a diagram showing a configuration of hardware of a personal computer 114 according to this embodiment.

FIG. 15 shows the hardware configuration of the personal computer 114 according to this embodiment. The personal computer 114 comprises a CPU 700, a ROM 702, a RAM 704, a communication interface 706, a hard disk drive 708, a database interface 710, a floppy disk drive 712, and a CD-ROM drive 714. The CPU 700 operates on the basis of programs stored in the ROM 702 and RAM 704 to control each section. The communication interface 706 communicates with the digital camera 110 and the printer 112. The database interface 710 writes data to a database and updates the contents of the database.

The floppy disk drive 712 reads data or a program from a floppy disk 720 to provide the read data or program to the communication interface 706. The CD-ROM drive 714 reads data or a program from a CD-ROM 722 to provide the read data or program to the communication interface 706. The communication interface 706 transmits the data or program provided by the floppy disk drive 712 or CD-ROM drive 714, to the digital camera 110 or the printer 112. The database interface 710 is connected to various databases 724 in order to transmit and receive data thereto and therefrom.

The program provided to the printer 112 is provided by the user in a recording medium such as the floppy disk 720 or CD-ROM 722. The program stored in the recording medium may be compressed or may not be compressed. The program is read out from the recording medium, installed in the digital camera 110 or printer 112 via the communication interface 706, and executed in the digital camera 110 or printer 112.

The program provided in the recording medium and installed in the digital camera 110 has a storing module, a display image generating module, a display module, a correction module, a manual correction module, an auto correction module and an output module as functional components. Operations which each module allows the digital camera 110 are the same as the operations of the corresponding members of the digital camera 110 described in FIGS. 8 to 11, and thus the description of these operations is omitted.

The program provided in the recording medium and installed in the printer 112 has a receiving module, a control module, a processing module, and a printing module as functional components. Operations which each module allows the printer 112 to perform are the same as the operations of the corresponding members of the printer 112 described in FIGS. 12 to 14, and thus the description of these operations is omitted.

The floppy disk 720 or CD-ROM 722, shown in FIG. 15 as an example of a recording medium, can store a part of the operation of or all the functions of the digital camera 110 or printer 112 according to the embodiments described in the application.

These programs may be read out directly from the recording medium by the digital camera 110 or printer 112 for execution or may be installed in the digital camera 110 or printer 112 before execution therein. Furthermore, these programs may be stored in a single recording medium or a plurality of recording media. Alternatively, they may be stored in a coded form.

In addition to a floppy disk or a CD-ROM, the recording medium includes an optical recording medium such as a DVD or a PD, a photomagnetic recording medium such as an MD, a tape medium, a magnetic recording medium, or a semiconductor memory such as an IC card or a miniature card. Alternatively, a storage device such as a hard disk or RAM installed in a server system connected to an exclusive communication network or the Internet may be used as a recording medium to provide programs to the digital camera 110 or the printer 112 via a communication network. Such a recording medium is used only to manufacture the digital camera 110 or the printer 112, and the profit-making manufacture, sale, or the like of such a recording medium clearly infringes on the patent right based on this application.

The digital camera 110 according to this embodiment outputs information on correction of an image executed by the digital camera 110, as tag information and in association with the image, thereby enabling the control of whether or not the printer 112 is to correct the image. Further, the printer 112 according to this embodiment can analyze the tag information received from the digital camera 110 to correct the image on the basis of information on correction of the image executed by the digital camera 110.

Consequently, the digital camera 110 and printer 112 according to this embodiment can provide such control that the printer 112 does not carry out the user's unintended correction on an image the chromaticity or brightness of which has been corrected by the digital camera 110 on the basis of the user's operation, thereby enabling an image to be printed to please the user.

The present invention has been described in conjunction with the embodiments, but the technical scope thereof is not limited to that described in the above-described embodiments. Various changes or improvements may be made to the above-described embodiments. It is apparent from the description in the claims that such changed or improved forms are also within the technical scope of the present invention.

As described above, according to the present invention, white balance adaptation rate information set by an electronic camera is recorded on a recording medium together with an image so that during printing, a printer takes the adaptation rate information to control white balance in accordance with settings for the camera. This avoids executing such correction as negates the atmosphere (tint) of a light source in a recorded image in which the photographer has purposefully allowed the atmosphere to remain.

Further, the present invention provides an image pickup device which outputs an image in association with information on correction of the image in order to control the correction of the image in an outer image processor.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image processing device, comprising:
    a receiving section which receives an image and information on correction of the image;
    a processing section which executes image processing on the image; and
    a control section which controls the image processing executed by the processing section, on the basis of information on correction of the image;
    wherein the receiving section receives, as information on correction of the image, information indicating whether or not the image has been corrected on the basis of a user's operation, and
    upon receiving information indicating that the image has been corrected on the basis of the user's operation, the control section inhibits the processing section from executing the image processing, wherein:
    the receiving section receives information indicative of the white balance adaptation rate of the image as information on correction of the image; and
    if the white balance adaptation rate does not have a predetermined value, the control section inhibits the processing section from executing the image processing for adjusting white balance.

2. The image processing device according to claim 1, further comprising a printing section which prints the image.

3. An image processing method, comprising:
    a receiving step of receiving an image and information on correction of the image;
    a processing step of executing image processing on the image; and
    a control step of controlling the image processing executed at the processing step, on the basis of information on correction of the image,
    wherein in the receiving step, as the information on correction of the image, information indicating whether or not the image has been corrected on the basis of a user's operation, and
    upon receiving information indicating that the image has been corrected on the basis of the user's operation, control is made in the control step so that executing the image processing in the processing step is prohibited, wherein:
    in the receiving step, information indicative of the white balance adaptation rate of the image is received as the information on correction of the image; and
    in the control step, if the white balance adaptation rate does not have a predetermined value, control is made in the control step so that executing the image processing for adjusting white balance in the processing step is prohibited.

4. An image pickup device, comprising:
    an image taking section which takes an image of a subject;
    a white balance adaptation rate setting section which sets a white balance adaptation rate for the taken image according to input by a user;
    an image correcting section which corrects the taken image based on the set white balance adaptation rate; and
    a recording section which records information indicative of the set white balance adaptation rate and the corrected image so that the image is inhibited from being subjected to the image processing in an image processing device for adjusting white balance if the recorded white balance adaptation rate does not have a predetermined value.

5. An image pickup method, comprising:
    taking an image of a subject;
    setting a white balance adaptation rate for the taken image according to input by a user;
    correcting the taken image based on the set white balance adaptation rate; and
    recording information indicative of the set white balance adaptation rate and the corrected image so that the image is inhibited from being subjected to the image processing in an image processing device for adjusting white balance if the recorded white balance adaptation rate does not have a predetermined value.

6. An image processing system comprising:
    the image pickup device according to claim 4; and
    the image processing device according to claim 1.

* * * * *